(12) United States Patent
Huang et al.

(10) Patent No.: US 12,382,351 B2
(45) Date of Patent: Aug. 5, 2025

(54) RETRANSMISSION METHOD, COMMUNICATION DEVICE AND STORAGE MEDIUM

(71) Applicant: SHENZHEN TRANSSION HOLDINGS CO., LTD., Shenzhen (CN)

(72) Inventors: Chiunwei Huang, Shenzhen (CN); Xingya Shen, Shenzhen (CN); Yili Xie, Shenzhen (CN); Wei Huang, Shenzhen (CN)

(73) Assignee: SHENZHEN TRANSSION HOLDINGS CO., LTD., Shenzhen (CN)

(*) Notice: Subject to any disclaimer, the term of this patent is extended or adjusted under 35 U.S.C. 154(b) by 0 days.

(21) Appl. No.: 18/772,619

(22) Filed: Jul. 15, 2024

(65) Prior Publication Data

US 2025/0106709 A1 Mar. 27, 2025

Related U.S. Application Data

(63) Continuation of application No. PCT/CN2024/081749, filed on Mar. 14, 2024.

(30) Foreign Application Priority Data

Sep. 22, 2023 (CN) .......................... 202311227169.6

(51) Int. Cl.
*H04W 4/00* (2018.01)
*H04L 1/1812* (2023.01)
(Continued)

(52) U.S. Cl.
CPC ..... *H04W 36/00725* (2023.05); *H04L 1/1812* (2013.01); *H04W 36/04* (2013.01); *H04W 36/324* (2023.05)

(58) Field of Classification Search
CPC ........... H04W 36/00725; H04W 36/04; H04W 36/324; H04L 1/1812
(Continued)

(56) References Cited

U.S. PATENT DOCUMENTS 8,243,660 B2 * 8/2012 Jeong ..................... H04L 47/824
                                                              370/329
12,035,324 B2 * 7/2024 Xu .......................... H04L 1/188
(Continued)

FOREIGN PATENT DOCUMENTS

CN      109588059 A    4/2019
CN      111132244 A    5/2020
(Continued)

OTHER PUBLICATIONS

First Office Action issued in counterpart Chinese Patent Application No. 202311227169.6, dated Nov. 2, 2023.
(Continued)

*Primary Examiner* — Amancio Gonzalez
(74) *Attorney, Agent, or Firm* — Westbridge IP LLC

(57) ABSTRACT

The present application retransmits the LTM random access-less cell switch completion information based on a scheduling method, and provides an information retransmission mechanism applicable to the LTM cell switch process, which can improve the transmission reliability of the LTM random access-less cell switch completion information, thereby reducing LTM cell switch failures and/or reduce service interruption delays.

11 Claims, 7 Drawing Sheets

(51) Int. Cl.
*H04W 36/00* (2009.01)
*H04W 36/04* (2009.01)
*H04W 36/32* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 12,052,107 | B2* | 7/2024 | Yang | H04W 4/40 |
| 12,167,473 | B1* | 12/2024 | Abdul Latheef | H04W 52/50 |
| 2012/0294313 | A1 | 11/2012 | Mitsuhashi | |
| 2023/0388871 | A1* | 11/2023 | Guo | H04W 36/0069 |
| 2024/0284277 | A1* | 8/2024 | Jeon | H04W 36/0072 |
| 2024/0298183 | A1* | 9/2024 | Garcia Morchon | H04W 12/69 |
| 2024/0298315 | A1* | 9/2024 | Maamari | H04W 72/21 |
| 2024/0334268 | A1* | 10/2024 | Leng | H04B 17/328 |
| 2024/0334281 | A1* | 10/2024 | Khoshkholgh Dashtaki | H04W 36/083 |
| 2024/0334357 | A1* | 10/2024 | Leng | H04L 1/1864 |
| 2024/0340736 | A1* | 10/2024 | Awada | H04W 56/0045 |
| 2024/0349144 | A1* | 10/2024 | Damnjanovic | H04W 36/0058 |
| 2024/0365401 | A1* | 10/2024 | Hu | H04W 74/0833 |
| 2024/0373490 | A1* | 11/2024 | Agiwal | H04W 76/19 |
| 2024/0381195 | A1* | 11/2024 | Leng | H04W 72/231 |
| 2024/0422631 | A1* | 12/2024 | Damnjanovic | H04W 36/08 |
| 2025/0008453 | A1* | 1/2025 | Kung | H04W 56/001 |
| 2025/0031105 | A1* | 1/2025 | Leng | H04W 36/0058 |
| 2025/0038909 | A1* | 1/2025 | Rudolf | H04L 5/0094 |
| 2025/0039942 | A1* | 1/2025 | Kung | H04W 72/23 |
| 2025/0056341 | A1* | 2/2025 | Cirik | H04W 36/0055 |
| 2025/0056348 | A1* | 2/2025 | Shih | H04W 74/04 |
| 2025/0056427 | A1* | 2/2025 | Koskela | H04W 74/0833 |
| 2025/0081066 | A1* | 3/2025 | Khoshkholgh Dashtaki | H04W 36/083 |
| 2025/0097989 | A1* | 3/2025 | Agiwal | H04L 1/08 |
| 2025/0175864 | A1* | 5/2025 | Kim | H04W 36/0058 |

FOREIGN PATENT DOCUMENTS

| | | |
|---|---|---|
| CN | 115380562 A | 11/2022 |
| CN | 116980083 A | 10/2023 |
| KR | 20230105313 A | 7/2023 |
| KR | 20230105314 A | 7/2023 |
| WO | 2023128731 A1 | 7/2023 |

OTHER PUBLICATIONS

Fujitsu et al., LTM cell switch execution and completion, R2-2307398, 3GPP TSG-RAN WG2 Meeting #123, dated Aug. 25, 2023.
Huawei et al., (TP for L1L2Mob BLCR for TS 38.401): L1/L2 Inter-cell Mobility, 3GPP TSG-RAN WG3 Meeting #118, R3-226258, dated Nov. 4, 2022.
International Search Report and Written Opinion issued in corresponding PCT Application No. PCT/CN2024/081749, dated Jun. 20, 2024.
Notification to Grant Patent Right for Invention issued in counterpart Chinese Patent Application No. 202311227169.6, dated Dec. 6, 2023.
Qualcomm Incorporated et al., LTM procedures, R2-2308614, 3GPP TSG-RAN WG2 Meeting #123, dated Aug. 25, 2023.
Second Office Action issued in counterpart Chinese Patent Application No. 202311227169.6, dated Nov. 16, 2023.
Xiaomi et al., Remaining issues of RACH-less LTM and early TA, R2-2307670, 3GPP TSG-RAN WG2 Meeting #123, dated Aug. 25, 2023.

* cited by examiner

RETRANSMISSION METHOD, COMMUNICATION DEVICE AND STORAGE MEDIUM

CROSS-REFERENCE TO RELATED APPLICATIONS

The present application is a continuation application of International Application No. PCT/CN2024/081749, filed on Mar. 14, 2024, which claims priority to Chinese Patent Application No. 202311227169.6, filed on Sep. 22, 2023. The disclosures of the above-mentioned applications are incorporated herein by reference in their entireties.

TECHNICAL FIELD

The present application relates to the technical field of communication, and in particular, to a retransmission method, a communication device and a storage medium.

BACKGROUND

In the existing protocol, during the LTM (Layer 1/Layer 2 triggered mobility) cell switch process, LTM random access-less cell switch completion information, including first uplink data of the LTM cell switch and/or RRC reconfiguration completion signaling, is sent through configured grant, which indicates the completion of the LTM random access-less cell switch. The transmission of the first uplink data and/or RRC reconfiguration completion signaling plays a key role in whether the LTM cell switch fails or not.

During the process of conceiving and implementing the present application, the inventor found that there are at least the following problems: if the reliability of the first uplink data and/or RRC reconfiguration completion signaling transmission is low, it can easily lead to the failure of the LTM cell switch, and/or service interruption delay.

The preceding description is intended to provide general background information and does not necessarily constitute related art.

SUMMARY

The main purpose of the present application is to provide a retransmission method, a communication device and a storage medium, aiming to provide an information retransmission mechanism suitable for the LTM cell switch process in order to improve the reliability of information transmission completed by LTM random access-less cell switch, reduce failures of LTM cell switch and/or reduce service interruption delays.

The present application provides a retransmission method, applied to a terminal device (such as a mobile phone), including:

S2, retransmitting Layer 1/Layer 2 triggered mobility (LTM) random access-less cell switch completion information based on a scheduling method.

In an embodiment, the method further includes at least one of the following:

determining configured grant configuration based on preconfiguration information;
starting a retransmission timer;
sending the LTM random access-less cell switch completion information through a default hybrid automatic repeat request; and
selecting or determining the scheduling method.

In an embodiment, the selecting or determining the scheduling method includes:

in response to timeout of the retransmission timer, determining that the scheduling method is configured grant; and/or,
in response to receiving dynamic grant information, determining that the scheduling method is dynamic grant according to the dynamic grant information.

In an embodiment, the scheduling method includes the configured grant and/or the dynamic grant.

In an embodiment, the LTM random access-less cell switch completion information includes radio resource control reconfiguration completion information and/or first uplink data.

In an embodiment, the retransmission timer includes a configured grant retransmission timer and/or an LTM cell switch retransmission timer.

In an embodiment, the dynamic grant information includes uplink scheduling and/or downlink scheduling.

In an embodiment, determining that the scheduling method is the dynamic grant according to the dynamic grant information includes:

in response to that the dynamic grant information is the uplink scheduling, a previous sending method is the configured grant, and previous sending content is the LTM random access-less cell switch completion information, determining that the scheduling method is the dynamic grant; and/or,
in response to that the dynamic grant information is the uplink scheduling, a previous sending method is the configured grant, and the retransmission timer is in a running state, determining that the scheduling method is the dynamic grant.

In an embodiment, the method further includes:

in response to that the dynamic grant information is the downlink scheduling, instructing new uplink transmission and/or downlink reception according to the downlink scheduling, and/or
stopping the retransmission timer.

In an embodiment, the method further includes at least one of the following:

sending, via a network device, the preconfiguration information;
retransmitting the LTM random access-less cell switch completion information through the default hybrid automatic repeat request;
determining retransmission by no toggle of new data indicator; and
receiving, via a network device, the LTM random access-less cell switch completion information.

The present application further provides a retransmission method, applied to a network device (such as a base station), including:

S3, receiving LTM random access-less cell switch completion information retransmitted by a terminal device based on a scheduling method.

In an embodiment, the method further includes at least one of the following:

sending preconfiguration information, so that the terminal device selects or determines the scheduling method based on the preconfiguration information, and retransmits the LTM random access-less cell switch completion information based on the scheduling method;
sending an LTM cell switch command;
sending dynamic grant information, so that the terminal device selects or determines the scheduling method based on the dynamic grant information, and retransmits the LTM random access-less cell switch completion information based on the scheduling method; and sending confirmation information and/or new transmission scheduling based on the LTM random access-less cell switch completion information.

In an embodiment, the preconfigured information includes a retransmission timer.

In an embodiment, the LTM cell switch command is configured to instruct the terminal device to perform LTM random access-less and/or start the retransmission timer.

In an embodiment, the dynamic grant information is also configured to instruct the terminal device to perform new uplink transmission and/or downlink transmission.

In an embodiment, the method further includes at least one of the following:
 determining, via the terminal device, the configured grant configuration based on the preconfiguration information;
 starting, the terminal device, the retransmission timer;
 sending, via the terminal device, the LTM random access-less cell switch completion information through the default hybrid automatic repeat request; and
 selecting or determining, via the terminal device, the scheduling method.

In an embodiment, selecting or determining, via the terminal device, the scheduling method includes:
 in response to the timeout of the retransmission timer, determining, via the terminal device, that the scheduling method is the configured grant; and/or
 in response to receiving the dynamic grant information, determining, via the terminal device, that the scheduling method is dynamic grant according to the dynamic grant information.

In an embodiment, the scheduling method includes configured grant and/or dynamic grant.

In an embodiment, the LTM random access-less cell switch completion information includes radio resource control reconfiguration completion information and/or the first uplink data.

In an embodiment, the retransmission timer includes a configured grant retransmission timer and/or an LTM cell switch retransmission timer.

In an embodiment, the dynamic grant information includes uplink scheduling and/or downlink scheduling.

In an embodiment, determining, via the terminal device, that the scheduling method is dynamic grant according to the dynamic grant information includes:
 in response to that the dynamic grant information is the uplink scheduling, the previous sending method is the configured grant, and the previous sending content is the LTM random access-less cell switch completion information, determining, via the terminal device, that the scheduling method is the dynamic grant; and/or
 in response to that the dynamic grant information is the uplink scheduling, the previous sending method is configured grant, and the retransmission timer is in the operating state, determining, via the terminal device, that the scheduling method is the dynamic grant.

In an embodiment, the method also includes:
 in response to that the dynamic grant information is the downlink scheduling, instructing, via the terminal device, new uplink transmission and/or downlink reception according to the downlink scheduling, and/or stopping, via the terminal device, the retransmission timer.

In an embodiment, the method also includes:
 retransmitting, via the terminal device, the LTM random access-less cell switch completion information through the default hybrid automatic repeat request; and/or,
 determining, via the terminal device, retransmission by no toggle of new data indicator.

The present application further provides a communication device, including a memory, a processor, and a retransmission program stored on the memory and executable on the processor, when the retransmission program is executed by the processor, the retransmission method as described above is implemented.

The present application further provides a storage medium, a computer program is stored on the storage medium, and when the computer program is executed by a processor, the retransmission method as described above is implemented.

The technical solution of the present application retransmits the LTM random access-less cell switch completion information based on a scheduling method, and provides an information retransmission mechanism applicable to the LTM cell switch process, which can improve the transmission reliability of the LTM random access-less cell switch completion information, thereby reducing LTM cell switch failures and/or reduce service interruption delays.

BRIEF DESCRIPTION OF THE DRAWINGS

The accompanying drawings, which are incorporated in and constitute a part of this specification, illustrate embodiments consistent with the present application and serve to explain the principles of the present application together with the specification. In order to more clearly illustrate the technical solutions of the embodiments of the present application, a brief introduction will be given to the accompanying drawings required in the description of the embodiments. Obviously, for those skilled in the art, other accompanying drawings can also be obtained based on these drawings without any creative effort.

Figure 1:
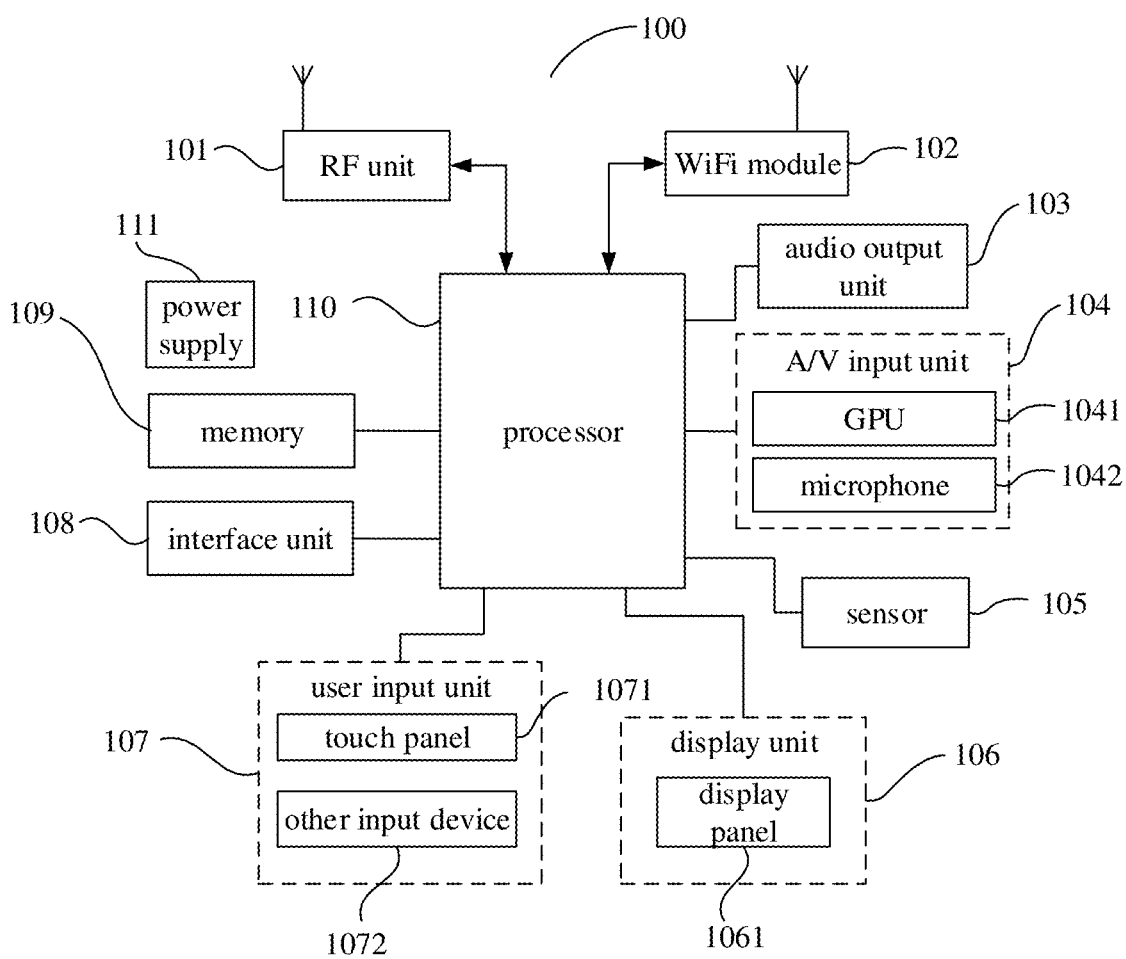
FIG. 1 is a schematic structural diagram of a hardware of a mobile terminal implementing various embodiments of the present application.

The realization of the purpose, functional features and advantages of the present application will be further described in conjunction with the embodiments and with reference to the accompanying drawings. Through the above-mentioned drawings, specific embodiments of the present application have been shown, which will be described in more detail below. These drawings and text descriptions are not intended to limit the scope of the present application in any way, but rather to illustrate the concept of the present application for those skilled in the art by referring to specific embodiments.

DETAILED DESCRIPTION OF THE EMBODIMENTS

Exemplary embodiments will be described in detail herein, examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the present application. Rather, they are merely examples of device and methods consistent with some aspects of the present application as recited in the appended claims.

It should be noted that in this document, the terms "include", "comprise" or any other variants thereof are intended to cover a non-exclusive inclusion. Thus, a process, method, article or device that includes a series of elements not only includes those elements, but also includes other elements that are not expressly listed, or also includes elements inherent to the process, method, article or device. If there are no more restrictions, the element defined by the sentence "including a . . . " does not exclude the existence of other identical elements in the process, method, article or device that includes the element. In addition, components, features, and elements with the same name in different embodiments of the present application may have the same or different meanings. Its specific meaning needs to be determined according to its explanation in the specific embodiment or further combined with the context in the specific embodiment.

It should be understood that although the terms "first", "second", "third", and the like may be used herein to describe various information, the information should not be limited to these terms. These terms are only used to distinguish the same type of information from one another. For example, without departing from the scope of this document, first information may also be called second information, and similarly, the second information may also be called first information. Depending on the context, the word "if" as used herein may be interpreted as "at" or "when" or "in response to a determination." Furthermore, as used herein, the singular forms "a", "an" and "the" are intended to include the plural forms as well, unless the context indicates otherwise. It should be further understood that the terms "comprising" and "including" indicate the existence of the features, steps, operations, elements, components, items, species, and/or groups, but does not exclude the existence, occurrence, or addition of one or more other features, steps, operations, elements, components, items, species, and/or groups. The terms "or", "and/or", "including at least one of" and the like used in the present application may be interpreted as inclusive, or mean any one or any combination. For example, "including at least one of: A, B, C" means "any of: A; B; C; A and B; A and C; B and C; A and B and C". As another example, "A, B or C" or "A, B and/or C" means "any of the following: A; B; C; A and B; A and C; B and C; A and B and C". Exceptions to this definition will only arise when combinations of elements, functions, steps, or operations are inherently mutually exclusive in some way.

It should be understood that although the various steps in the flowchart in the embodiment of the present application are displayed sequentially as indicated by the arrows, these steps are not necessarily executed sequentially in the order indicated by the arrows. Unless otherwise specified herein, there is no strict order restriction on the execution of these steps, and they can be executed in other orders. Moreover, at least some of the steps in the drawing may include multiple sub-steps or multiple stages, these sub-steps or stages are not necessarily executed at the same time, but can be executed at different times. The execution sequence thereof is not necessarily performed sequentially, but may be performed in turn or alternately with other steps or sub-steps of other steps or at least a part of the stages.

Depending on the context, the words "when" or "if" as used herein may be interpreted as "at" or "when" or "in response to determining" or "in response to detecting." Similarly, depending on the context, the phrases "if determined" or "if detected (the stated condition or event)" can be interpreted as "when determined" or "in response to the determination" or "when detected (the stated condition or event)" or "in response to detection (the stated condition or event)".

It should be noted that in this article, step codes such as S1 and S1 are used for the purpose of expressing the corresponding content more clearly and concisely, and do not constitute a substantive limitation on the order. Those skilled in the art may perform S2 first and then S1 during specific implementation, but these should all be within the protection scope of the present application.

It should be understood that the specific embodiments described here are only used to explain the present application, and are not intended to limit the present application.

In the following description, the use of suffixes such as "module", "part" or "unit" for denoting elements is only for facilitating the description of the present application and has no specific meaning by itself. Therefore, "module", "part" or "unit" may be used in combination.

The communication device in the present application can be a terminal device (such as a mobile phone) or a network device (such as a base station). The specific meaning needs to be clarified according to the context.

The terminal device can be implemented in various forms. For example, the terminal device described in the present application can include a smart terminal device such as a mobile phone, a tablet computer, a notepad computer, a hand-held computer, a personal digital assistants (PDA), a portable media player (PMP), a navigation device, a wearable device, a smart bracelet and a pedometer, as well as a fixed terminal device such as a digital TV and a desktop computer.

In the following description, a mobile terminal will be described as an example. Those skilled in the art will understand that, in addition to elements specifically used for mobile purposes, the configuration according to the embodiments of the present application can also be applied to the fixed terminal device.

As shown in FIG. 1, FIG. 1 is a schematic structural diagram of a hardware of a mobile terminal that implements various embodiments of the present application. The mobile terminal 100 can include a radio frequency (RF) unit 101, a WiFi module 102, an audio output unit 103, and an audio/video (A/V) input unit 104, a sensor 105, a display unit 106, a user input unit 107, an interface unit 108, a memory 109, a processor 110, a power supply 111 and the like. Those skilled in the art can understand that the structure of the mobile terminal shown in FIG. 1 does not constitute a limitation on the mobile terminal. The mobile terminal can include more or fewer components than shown in the drawing, or a combination of some components, or differently arranged components.

Hereinafter, each component of the mobile terminal will be specifically introduced with reference to FIG. 1.

The radio frequency unit 101 can be used for transmitting and receiving signals during the process of transceiving information or talking. Specifically, after receiving downlink information of a base station, the downlink information is processed by the processor 110; in addition, uplink data is sent to the base station. Generally, the RF unit 101 includes, but is not limited to, an antenna, at least one amplifier, a transceiver, a coupler, a low noise amplifier, a duplexer and the like. In addition, the RF unit 101 can also communicate with the network and other devices through wireless communication. The above wireless communication can use any communication standard or protocol, including but not limited to Global System of Mobile communication (GSM), General Packet Radio Service (GPRS), Code Division Multiple Access 2000 (CDMA2000), Wideband Code Division Multiple Access (WCDMA), Time Division-Synchronous Code Division Multiple Access (TD-SCDMA), Frequency Division Duplexing-Long Term Evolution (FDD-LTE), Time Division Duplexing-Long Term Evolution (TDD-LTE), 5G and 6G or the like.

WiFi is a short-range wireless transmission technology. The mobile terminal can help users transmit and receive email, browse webpages, access streaming media and the like through the WiFi module 102, and WiFi provides users with wireless broadband Internet access. Although FIG. 1 shows the WiFi module 102, it can be understood that it is not a necessary component of the mobile terminal and can be omitted as needed without changing the essence of the present application.

When the mobile terminal 100 is in a call signal receiving mode, a call mode, a recording mode, a voice recognition mode, a broadcast receiving mode, or the like, the audio output unit 103 can convert audio data received by the RF unit 101 or the WiFi module 102 or stored in the memory 109 into an audio signal and output the audio signal as sound. Furthermore, the audio output unit 103 can also provide audio output related to a specific function performed by the mobile terminal 100 (for example, call signal reception sound, message reception sound, or the like). The audio output unit 103 can include a speaker, a buzzer, or the like.

The A/V input unit 104 is configured to receive audio or video signals. The A/V input unit 104 can include a graphics processing unit (GPU) 1041 and a microphone 1042. The GPU 1041 can process image data of a still image or a video obtained by an image capturing device (such as a camera) in a video capturing mode or an image capturing mode. The processed image frame can be displayed on the display unit 106. The image frame processed by the GPU 1041 can be stored in the memory 109 (or other storage medium) or transmitted via the RF unit 101 or WiFi module 102. The microphone 1042 can receive sound (audio data) via the microphone 1042 in operation modes such as a call mode, a recording mode, a voice recognition mode, and the like, and can process such sound into audio data. The processed audio (voice) data can be converted into a format that can be sent to a mobile communication base station via the RF unit 101 for output in the call mode. The microphone 1042 can perform various types of noise removal (or suppression) algorithms to eliminate (or suppress) noise or interference generated during the process of transceiving audio signals.

The mobile terminal 100 also includes at least one sensor 105, such as a light sensor, a motion sensor, and other sensors. In an embodiment, the light sensor includes an ambient light sensor and a proximity sensor. In an embodiment, the ambient light sensor can adjust the brightness of a display panel 1061 according to the brightness of the ambient light. The proximity sensor can turn off the display panel 1061 and/or the backlight when the mobile terminal 100 is moved to the ear. As a kind of motion sensor, an accelerometer sensor can detect the magnitude of acceleration in various directions (usually three axes) and detect the magnitude and direction of gravity when it is stationary, and can identify the gesture of the mobile terminal (such as horizontal and vertical screen switching, related games, magnetometer attitude calibration), vibration recognition related functions (such as pedometer, tap), or the like. The mobile terminal can also be equipped with other sensors such as a fingerprint sensor, a pressure sensor, an iris sensor, a molecular sensor, a gyroscope, a barometer, a hygrometer, a thermometer, an infrared sensor and other sensors, which will not be repeated here.

The display unit 106 is configured to display information input by the user or information provided to the user. The display unit 106 can include the display panel 1061, which can be configured in the form of a liquid crystal display (LCD), an organic light-emitting diode (OLED), or the like.

The user input unit 107 can be configured to receive input numeric or character information, and generate key signal input related to user settings and function control of the mobile terminal. In an embodiment, the user input unit 107 can include a touch panel 1071 and other input devices 1072. The touch panel 1071, also called a touch screen, can collect touch operations of the user on or near it (for example, the user uses fingers, stylus and other suitable objects or accessories to operate on the touch panel 1071 or near the touch panel 1071), and drive the corresponding connection device according to a preset program. The touch panel 1071 can include two parts of a touch detection device and a touch controller. In an embodiment, the touch detection device detects a touch position of the user, detects the signal brought by the touch operation, and transmits the signal to the touch controller. The touch controller receives touch information from the touch detection device, converts the touch information into contact coordinates, and sends it to the processor 110. The touch controller can receive and execute the instructions sent by the processor 110. In addition, the touch panel 1071 can be implemented in multiple types such as resistive, capacitive, infrared, and surface acoustic wave. In addition to the touch panel 1071, the user input unit 107 can also include other input devices 1072. In an embodiment, the other input devices 1072 can include, but are not limited to, one or more of physical keyboards, function keys (such as volume control buttons, switch buttons), trackballs, mice, joysticks and the like, which are not particular limited here.

In an embodiment, the touch panel 1071 can cover the display panel 1061. After the touch panel 1071 detects a touch operation on or near it, the touch operation is transmitted to the processor 110 to determine the type of the touch event. Subsequently, the processor 110 provides a corresponding visual output on the display panel 1061 according to the type of the touch event. In FIG. 1, although the touch panel 1071 and the display panel 1061 are used as two independent components to implement the input and output functions of the mobile terminal, in some embodiments, the touch panel 1071 and the display panel 1061 can be integrated to implement the input and output functions of the mobile terminal, which is not particular limited here.

The interface unit 108 serves as an interface through which at least one external device can be connected to the mobile terminal 100. For example, the external device can include a wired or wireless headphone port, an external power source (or battery charger) port, a wired or wireless data port, a memory card port, a port for connecting a device with an identification module, an audio input/output (I/O) port, a video I/O port, an earphone port or the like. The interface unit 108 can be configured to receive input (for example, data information, power) from an external device and transmit the received input to one or more elements in the mobile terminal 100 or can be configured to transfer data between the mobile terminal 100 and the external device.

The memory 109 can be configured to store software programs as well as various data. The memory 109 can mainly include a storage program area and a storage data area. In an embodiment, the storage program area can store an operating system, at least one application required by the function (such as a sound play function, an image play function) and the like. The storage data area can store data (such as audio data, phone book) created based on the use of the mobile phone. In addition, the memory 109 can include a high-speed random access memory, and can also include a non-volatile memory, such as at least one magnetic disk storage device, a flash memory device, or other volatile solid-state storage devices.

The processor 110 is a control center of the mobile terminal, and uses various interfaces and lines to connect various parts of the entire mobile terminal. By running or performing software programs and/or modules stored in the memory 109, and calling the data stored in the memory 109, various functions and processing data of the mobile terminal are executed, thereby overall monitoring of the mobile terminal is performed. The processor 110 can include one or more processing units; preferably, the processor 110 can integrate an application processor and a modem processor. In an embodiment, the application processor mainly processes an operating system, a user interface, an application or the like. The modem processor mainly processes wireless communication. It can be understood that the foregoing modem processor may not be integrated into the processor 110.

The mobile terminal 100 can also include a power source 111 (such as a battery) for supplying power to various components. Preferably, the power supply 111 can be logically connected to the processor 110 through a power management system, so that functions such as charging, discharging, and power consumption management can be managed through the power management system.

Although not shown in FIG. 1, the mobile terminal 100 can also include a Bluetooth module and the like, which will not be repeated herein.

In order to facilitate the understanding of the embodiments of the present application, the following describes the communication network system on which the mobile terminal of the present application is based.

Figure 2:
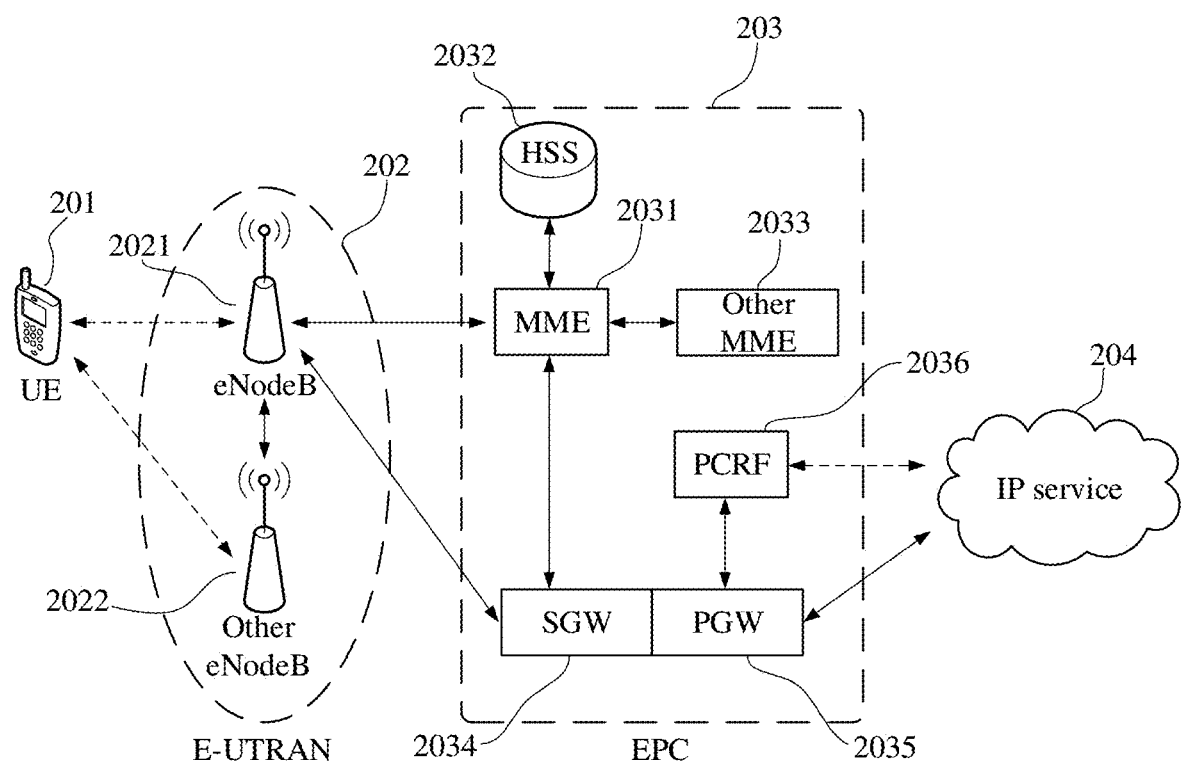
FIG. 2 is an architectural diagram of a communication network system according to an embodiment of the present application.

As shown in FIG. 2, FIG. 2 is an architectural diagram of a communication network system according to an embodiment of the present application. The communication network system is a New Radio (NR) system of universal mobile communication technology. The NR system includes User Equipment (UE) 201, Evolved UMTS Terrestrial Radio Access Network (E-UTRAN) 202, Evolved Packet Core Network (EPC) 203 and the operator's IP service 204 that are sequentially connected in communication.

In an embodiment, the UE 201 can be the above-mentioned terminal device 100, which will not be repeated here.

The E-UTRAN 202 includes eNodeB 2021, other eNodeB 2022 and the like. In an embodiment, the eNodeB 2021 can be connected to other eNodeBs 2022 through a backhaul (for example, an X2 interface). The eNodeB 2021 is connected to the EPC 203. The eNodeB 2021 can provide access from the UE 201 to the EPC 203.

The EPC 203 can include Mobility Management Entity (MME) 2031, Home Subscriber Server (HSS) 2032, other MMEs 2033, and Serving Gate Way (SGW) 2034, Packet Data Network Gateway (PDN Gate Way, PGW) 2035 and Policy and Charging Rules Function (PCRF) 2036, and so on. In an embodiment, MME 2031 is a control node that processes signaling between UE 201 and EPC 203, and provides bearer and connection management. HSS 2032 is configured to provide some registers to manage functions such as the home location register (not shown), and save some user-specific information about service feature, data rates, and so on. All user data can be sent through SGW 2034, PGW 2035 can provide UE 201 IP address allocation and other functions. PCRF 2036 is a policy and charging control policy decision point for service data flows and IP bearer resources, which selects and provides available policy and charging control decisions for policy and charging execution functional units (not shown).

The IP service 204 can include Internet, intranet, IP Multimedia Subsystem (IMS), or other IP services.

Although the LTE system is described above as an example, those skilled in the art should know that, the present application is not only applicable to the LTE system, but also applicable to other wireless communication systems, such as GSM, CDMA2000, WCDMA, TD-SCDMA, 5G and new network systems (such as 6G) in the future, or the like, which is not limited herein.

Figure 3:
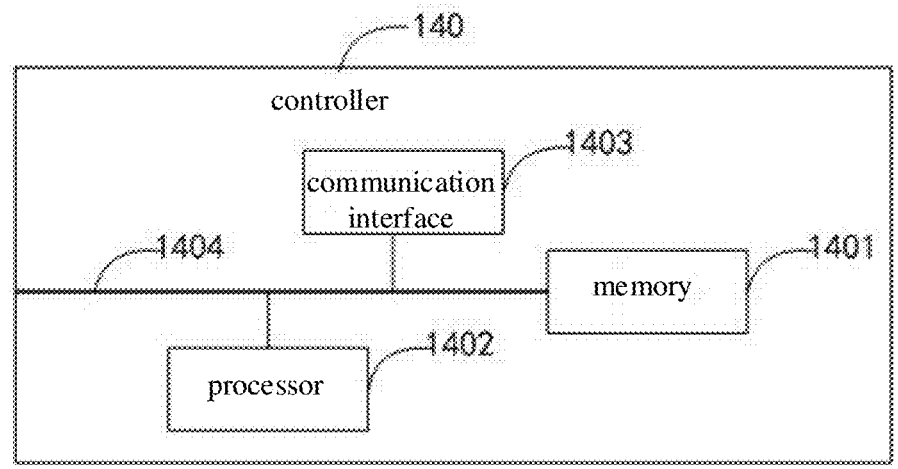
FIG. 3 is a schematic structural diagram of a hardware of a controller 140 according to the present application.

FIG. 3 is a schematic structural flowchart of a hardware of a controller 140 according to the present application. The controller 140 includes: a memory 1401 and a processor 1402. The memory 1401 is configured to store a program instruction. The processor 1402 is configured to call the program instruction in the memory 1401 to execute the steps performed by the controller in the above embodiment of the method. Its implementation principle and the beneficial effects are similar and will not be repeated here.

In an embodiment, the above-mentioned controller also includes a communication interface 1403, which can be connected to the processor 1402 through a bus 1404. The processor 1402 can control the communication interface 1403 to implement the receiving and sending functions of the controller 140.

Figure 4:
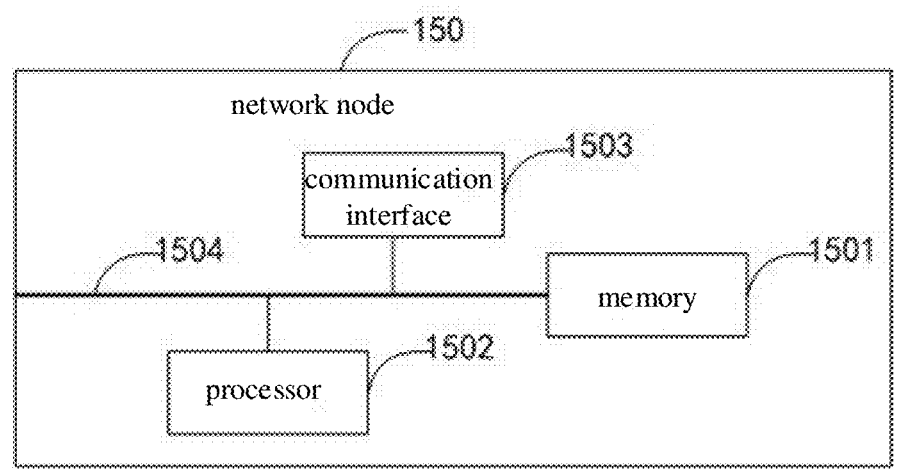
FIG. 4 is a schematic structural diagram of a hardware of a network node 150 according to the present application.

FIG. 4 is a schematic structural diagram of the hardware of a network node 150 according to the present application. The network node 150 includes: a memory 1501 and a processor 1502. The memory 1501 is configured to store a program instruction. The processor 1502 is configured to call the program instruction in the memory 1501 to execute the steps performed by the head node in the above embodiment of the method. Its implementation principle and the beneficial effects are similar and will not be repeated here.

In an embodiment, the above-mentioned controller also includes a communication interface 1503, which can be connected to the processor 1502 through a bus 1504. The processor 1502 can control the communication interface 1503 to implement the receiving and transmitting functions of the network node 150.

The above integrated modules implemented in the form of software function modules can be stored in a computer-readable storage medium. The above-mentioned software function modules are stored in a storage medium and include several instructions to cause a computer device (which can be a personal computer, a server, or a network device, etc.) or a processor to execute some steps of the methods in various embodiments of the present application.

In the above embodiments, it can be implemented in whole or in part by software, hardware, firmware, or any combination thereof. When implemented using software, it can be implemented in whole or in part in the form of the computer program product. The computer program product includes one or more computer instructions. When computer program instructions are loaded and executed on the computer, processes or functions according to embodiments of the present application are generated in whole or in part. The computer can be a general purpose computer, a special purpose computer, a computer network, or other programmable device. The computer instructions can be stored in the storage medium or transmitted from one storage medium to another storage medium, for example, the computer instructions can be transmitted from a website site, computer, server or data center via wired (such as coaxial cable, optical fiber, digital user line (DSL)) or wireless (such as infrared, wireless, microwave, etc.) to another website site, computer, server or data center. The storage medium can be any available medium that can be accessed by the computer or a data storage device such as a server or data center that contains one or more available media integrations. The available media can be magnetic media (such as floppy disk, storage disk, magnetic tape), optical media (such as DVD), or semiconductor media (such as solid state disk (SSD)), etc.

Based on the above-mentioned hardware structure of the mobile terminal and communication network system, various embodiments of the present application are proposed.

Figure 5:
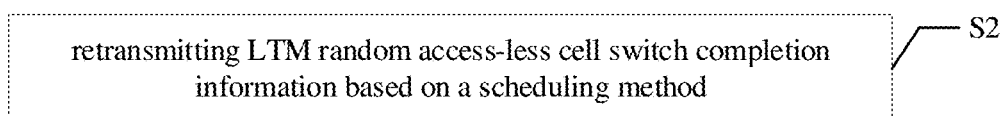
FIG. 5 is a schematic flowchart of a retransmission method according to an embodiment of the present application.

Referring to FIG. 5, FIG. 5 is a schematic flowchart of a retransmission method according to an embodiment of the present application. The retransmission method in the embodiment of the present application can be applied to a terminal device (such as a mobile phone), and includes:

S2, retransmitting Layer 1/Layer 2 triggered mobility (LTM) random access-less cell switch completion information based on a scheduling method.

In the existing protocol, during LTM cell switch process, the beam indication of the candidate cell is carried through an LTM cell switch command, and the source cell selects the corresponding beam through the L1 measurement report result. However, the beam indicated by the source cell is not ideal. When the terminal device transmits first uplink data to the indicated beam, the candidate cell cannot learn the access of the terminal device due to large interference (low signal interference noise ratio).

The embodiment of the present application introduces an information retransmission mechanism based on the scheduling method suitable for the LTM cell switch process to improve transmission reliability of LTM random access-less cell switch completion information including the first uplink data and/or RRC reconfiguration completion signaling.

In an embodiment, the source cell sends configuration information of at least one LTM candidate cell to the terminal device through RRC reconfiguration signaling.

In an embodiment, the terminal device receives at least one LTM candidate cell configuration information and saves it locally.

In an embodiment, the at least one LTM candidate cell configuration information is candidate cell preconfiguration information.

In an embodiment, the preconfiguration information can include a configured grant (CG) and/or a retransmission timer.

In an embodiment, the source cell receives a Timing Advance (TA) value provided by the candidate cell and determines the cell to perform LTM cell switch, and sends the TA value of the corresponding candidate cell to the terminal device through an LTM cell switch command.

In an embodiment, the terminal device receives the LTM cell switch command.

In an embodiment, the terminal device performs random access-less cell switch to the target candidate cell based on the TA value carried in the LTM cell switch command, determines the CG configuration based on the beam indication information, and starts the retransmission timer.

In an embodiment, the terminal device sends the LTM random access-less cell switch completion information according to the determined CG configuration.

In an embodiment, the retransmission timer includes a CG retransmission timer and/or an LTM cell switch retransmission timer.

In an embodiment, the LTM random access-less cell switch completion information includes radio resource control reconfiguration completion information and/or the first uplink data.

In an embodiment, the terminal device sends the LTM random access-less cell switch completion information through a default hybrid automatic repeat request.

In an embodiment, the terminal device selects or determines the scheduling method, and retransmits the LTM random access-less cell switch completion information based on the scheduling method.

In an embodiment, during the operation of the retransmission timer, the terminal device does not retransmit the LTM random access-less cell switch completion information. In an embodiment, if the retransmission timer times out, the terminal device determines that the scheduling method is configured grant, and retransmits the LTM random access-less cell switch completion information through configured grant.

In an embodiment, during the operation of the retransmission timer, if the terminal device receives dynamic grant information sent by the target cell, it can determine that the scheduling method is dynamic grant according to the dynamic grant information, and the LTM random access-less cell switch completion information is retransmitted through dynamic grant.

Through the above solution, this embodiment specifically retransmits the LTM random access-less cell switch completion information according to the scheduling method, and provides an information retransmission mechanism suitable for the LTM cell switch process, which can improve transmission reliability of the LTM random access-less cell switch completion information, thereby reducing LTM cell switch failures and/or reducing service interruption delays.

Figure 6:
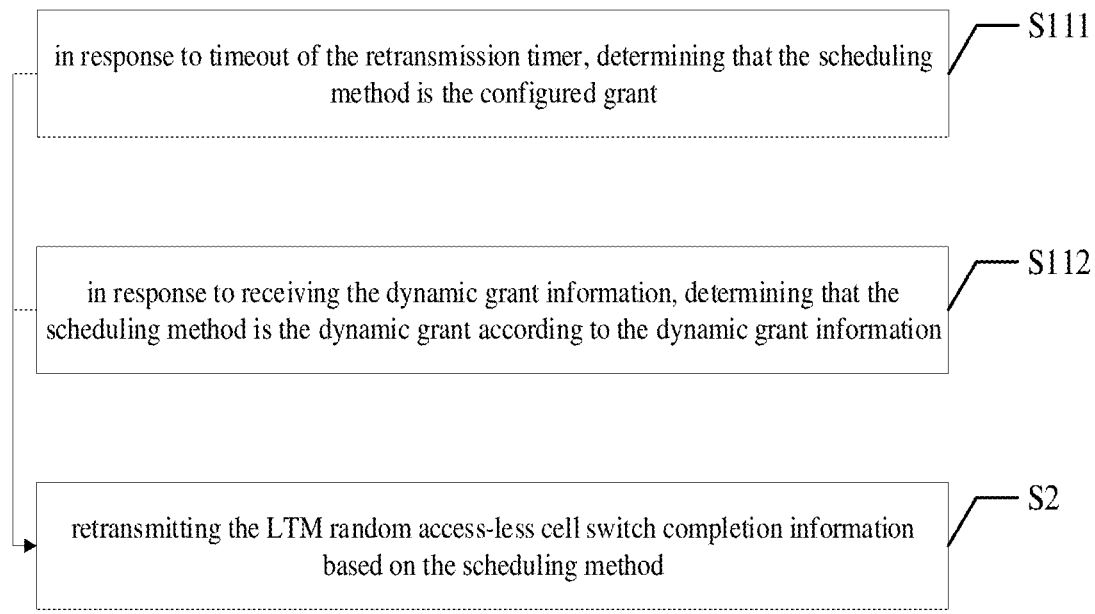
FIG. 6 is a schematic flowchart of a retransmission method according to an embodiment of the present application.

Based on the above embodiment of the present application, another embodiment of the present application provides a retransmission method. Referring to FIG. 6. FIG. 6 is a schematic flowchart of the retransmission method according to an embodiment of the present application, which shows before step S2 of retransmitting the LTM random access-less cell switch completion information based on the scheduling method, the method can also include:

S11, selecting or determining the scheduling method.

In an embodiment, the scheduling method includes configured grant and/or dynamic grant.

In an embodiment, selecting or determining the scheduling method includes:
- S111, in response to timeout of the retransmission timer, determining that the scheduling method is the configured grant; and/or,
- S112, in response to receiving the dynamic grant information, determining that the scheduling method is the dynamic grant according to the dynamic grant information.

In an embodiment, the retransmission timer includes a configured grant retransmission timer and/or an LTM cell switch retransmission timer.

In an embodiment, the configured grant retransmission timer can also be cg-RetransmissionTimer or cg-SDT-RetransmissionTimer.

In an embodiment, the LTM cell switch retransmission timer can be cg-LTM-RetransmissionTimer, which is used for random access-less of LTM cell switch retransmission, and is not specifically limited in the embodiment of the present application.

In an embodiment, the present application considers supporting configured grant and dynamic scheduling retransmission. In an embodiment, the dynamic scheduling carries retransmission scheduling indication information.

In an embodiment, the terminal device sends the LTM random access-less cell switch completion information according to the determined configured grant configuration.

In an embodiment, the retransmission timer can be started before or after the LTM random access-less cell switch completion information is sent.

In an embodiment, after the retransmission timer times out, the terminal device retransmits the LTM random access-less cell switch completion information through the configured grant, which, in an embodiment, includes: sending the scheduling information and/or hybrid automatic repeat request (HARQ) information to the HARQ entity and further performing retransmission processing.

In an embodiment, the terminal device retransmits the first uplink data through the default HARQ process.

In an embodiment, the retransmission will not be regarded as a new data indicator (NDI) toggled.

In an embodiment, the HARQ information includes at least one of NDI, HARQ process ID.

In an embodiment, the new data indicator is used to indicate that the data sent this time is a new transmission or a retransmission of the previous data sent. In an embodiment, the new data indicator determines that the data sent this time is a new transmission by toggling, and the new data indicator determines that it is a retransmission by not toggling. For example, the NDI indication of the previous data sent is 0. If it is determined to be a retransmission this time, the NDI indication of the data sent this time will still be 0.

In an embodiment, the target cell responds to the first uplink data sent by the terminal device, sends new scheduled transmission information and considers the LTM cell switch to be completed. After receiving the new scheduling transmission (new transmission) information of the target cell, the terminal device regards the candidate cell as the serving cell.

In an embodiment, the terminal device releases the configured grant after completing the LTM cell switch.

In an embodiment, the terminal device stops the retransmission timer.

In an embodiment, the dynamic grant information includes uplink scheduling and/or downlink scheduling.

In an embodiment, the terminal device can confirm whether the LTM cell switch is completed by determining the new transmission scheduling. In an embodiment, if the scheduling is new downlink scheduling and/or new uplink scheduling, the LTM cell switch is deemed to be completed.

In an embodiment, when the new transmission scheduling is the uplink scheduling and the previous transmission is performed through configured grant Type 1 or configured grant Type 2, if the content of the previous transmission is the LTM random access-less cell switch completion information, it is regarded as a scheduling retransmission, and/or, if the previously sent content does not include the LTM random access-less cell switch completion information, the LTM cell switch is deemed to be completed.

In an embodiment, when the new transmission scheduling is the uplink scheduling and the previous transmission is performed through configured grant Type 1 or configured grant Type 2, if the retransmission timer is still running, it is considered to be a scheduling retransmission, and/or, if the retransmission timer is not running, the LTM cell switch is deemed to be completed.

In this embodiment, through the above solution, specifically, in response to the timeout of the retransmission timer, determining that the scheduling method is configured grant; and/or in response to receiving dynamic grant information, determining that the scheduling method is dynamic grant based on the dynamic grant information. It is realized that the LTM random access-less cell switch completion information can be retransmitted not only through configured grant, but also retransmitted through dynamic grant, clarifying the processing mechanism in different situations, and/or making the scheduling method more flexible.

Figure 7:
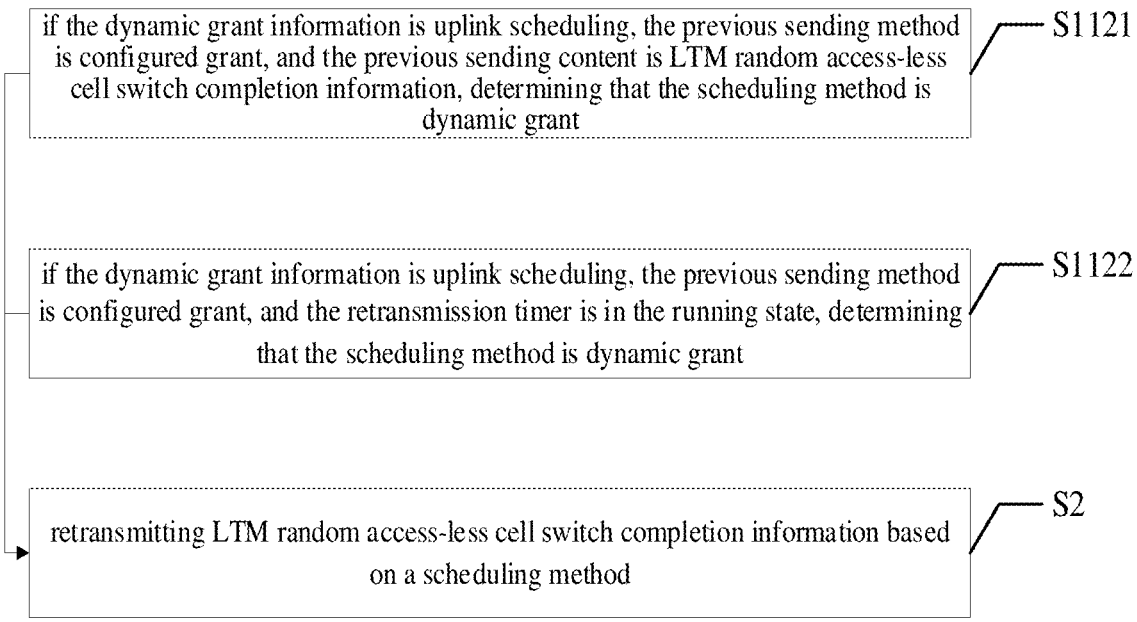
FIG. 7 is a schematic flowchart of a retransmission method according to an embodiment of the present application.

Based on any of the foregoing embodiments of the present application, this embodiment further discloses the retransmission method in the foregoing embodiments. Referring to FIG. 7, FIG. 7 is a schematic flowchart of the retransmission method according to an embodiment of the present application, which shows step S112 of determining that the scheduling method is dynamic scheduling according to the dynamic grant information includes:

- S1121, if the dynamic grant information is uplink scheduling, the previous sending method is configured grant, and the previous sending content is LTM random access-less cell switch completion information, determining that the scheduling method is dynamic grant; and/or
- S1122, if the dynamic grant information is uplink scheduling, the previous sending method is configured grant, and the retransmission timer is in the running state, determining that the scheduling method is dynamic grant.

Currently for the same HARQ process, when the terminal device receives the (dynamic) scheduling that a physical downlink control channel (PDCCH) meets cell radio network temporary identification (C-RNTI), regardless of whether it is Type 1 configured grant and/or Type 2 configured grant (the scheduling that PDCCH meets the CS-RNTI) last time, the NDI will be regarded as toggled, that is, as a new transmission scheduling, therefore, the terminal device will consider that LTM random access-less cell switch completion information has been successfully received by the network device and/or that the LTM cell switch is completed, but there is a possibility that the network device has not successfully received the uplink data sent by the terminal device. And/or, the current LTM cell switch includes both configured grant and dynamic grant retransmission, and the dynamic grant fails to clearly indicate whether it is retransmission scheduling.

In the embodiment of the present application, it is considered to support configured grant and dynamic grant retransmission. In an embodiment, the dynamic grant carries retransmission scheduling indication information.

In an embodiment, the network device sends the dynamic grant information, and the dynamic grant information includes uplink scheduling and/or downlink scheduling. The terminal device further processes based on the dynamic grant information.

In an embodiment, if the scheduling information is downlink scheduling and the terminal device has initially sent the LTM random access-less cell switch completion information, the LTM cell switch is deemed to be completed.

In an embodiment, the downlink scheduling is new transmission scheduling.

In an embodiment, the downlink scheduling and the initial transmission of the first uplink data use the same HARQ process or the default HARQ process.

In an embodiment, the terminal device notifies the upper layer that the LTM cell switch is completed.

In an embodiment, if the scheduling information is uplink scheduling and the terminal device has initially sent the LTM random access-less cell switch completion information,
when the uplink scheduling is received and the previous transmission is performed using configured grant Type 1 or Type 2, if the previous transmission is the LTM random access-less cell switch completion information (including radio resource control reconfiguration completion information and/or the first uplink data), the NDI is not toggled, and it is regarded as retransmission scheduling; and/or, if the previous transmission does not include radio resource control reconfiguration completion information or the first uplink data, the NDI is toggled, and the LTM cell switch is deemed to be completed; and/or
when the uplink schedule is received and the previous configured grant is Type 1 or Type 2, if the retransmission timer is still running, the NDI will not be toggled, which is regarded as a retransmission scheduling; and/or, if the retransmission timer is not running, the NDI is toggled, which indicates that the LTM cell switch is completed.

In an embodiment, the terminal device retransmits the LTM random access-less cell switch completion information according to the dynamic grant.

In an embodiment, the network device receives the LTM random access-less cell switch completion information.

In an embodiment, the terminal device sends new uplink data and/or receives new downlink data according to the dynamic scheduling.

Through the above solution, this embodiment specifically determines that the scheduling method is dynamic grant according to the dynamic grant information, including: if the dynamic grant information is uplink scheduling, the previous sending method is configured grant, and the previous sending content is LTM random access-less cell switch completion information, it is determined that the scheduling method is dynamic grant; and/or, if the dynamic grant information is uplink scheduling, the previous sending method is configured grant, and the retransmission timer is in the running state, it is determined that the scheduling method is dynamic scheduling. This provides a method to retransmit LTM random access-less cell switch completion information through dynamic grant, clarify the processing mechanism in different situations, and/or make the scheduling method more flexible.

Based on any of the foregoing embodiments of the present application, this embodiment further discloses the retransmission method in the foregoing embodiments.

Figure 8:
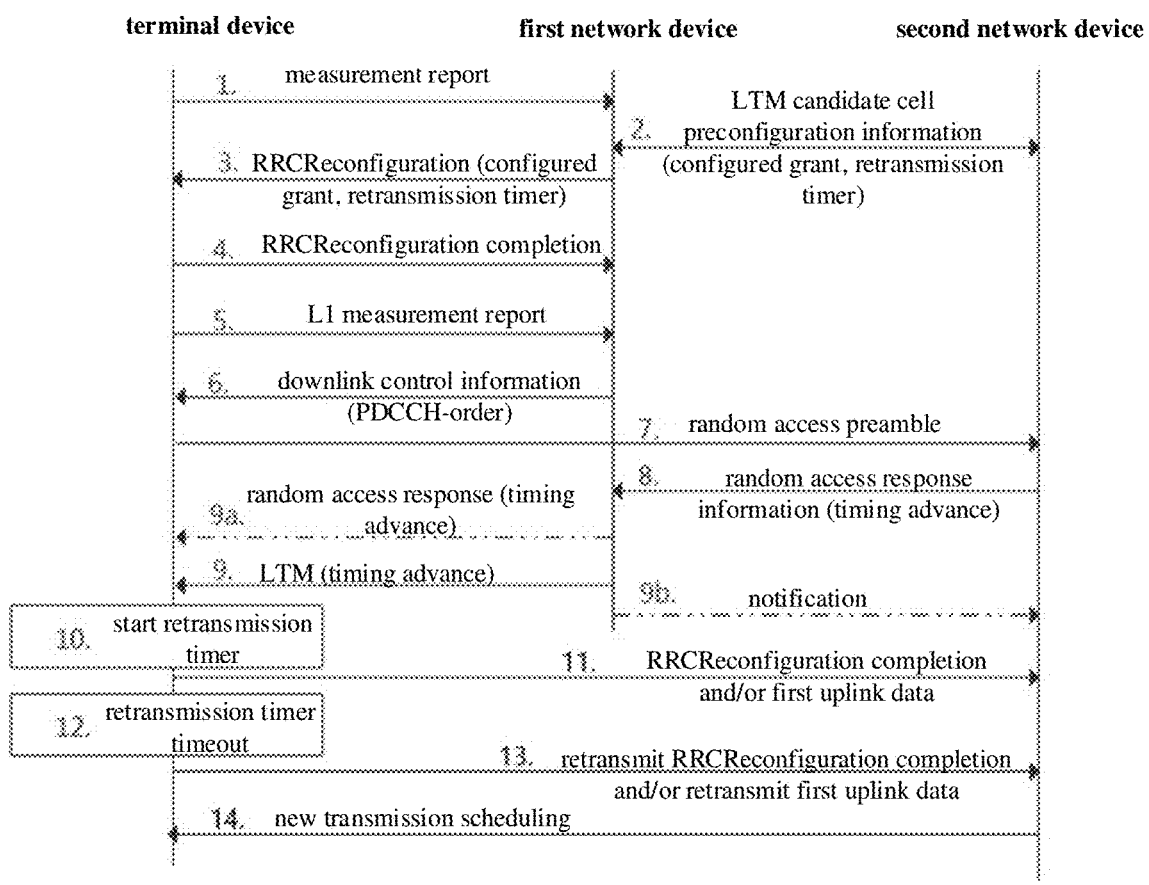
FIG. 8 is a schematic diagram of an interaction process according to an embodiment of the present application.

Referring to FIG. 8, FIG. 8 is a schematic diagram of an interaction process according to an embodiment of the present application. As shown in FIG. 8, the terminal device reports a measurement report (MR) to the source cell. In an embodiment, the measurement report is a layer 3 (L3) measurement report.

In an embodiment, the source cell obtains at least one candidate cell configuration (LTM-Candidate) information, including: candidate cell configuration (ltm-CandidateConfig) and/or a retransmission timer.

In an embodiment, the retransmission timer includes a configured grant retransmission timer and/or an LTM cell switch retransmission timer, for example, cg-LTM-RetransmissionTimer, which is used to retransmit the LTM random access-less cell switch completion information.

In an embodiment, the candidate cell configuration information also includes at least one of early uplink synchronization configuration (EarlyUL-SyncConfig), configured grant configuration (Configured Grant Config), candidate cell complete configuration indication (ltm-ConfigComplete), layer one measurement configuration (CSI-MeasConfig) and a new terminal device wireless temporary identity (newUE-Identity).

In an embodiment, the layer one measurement configuration includes: LTM channel status information resource configuration (LTM-CSI-ResourceConfig) and/or LTM channel status information report configuration (LTM-CSI-ReportConfig).

In an embodiment, the configured grant configuration is also associated with beam information (TCI-State).

In an embodiment, the configured grant configuration includes: configured grant type 1 (CG Type 1).

In an embodiment, the new terminal device wireless temporary identity includes but is not limited to at least one of C-RNTI, CS-RNTI, and cg-LTM-CS-RNTI.

In an embodiment, the cg-LTM-CS-RNTI is a LTM configured grant retransmission wireless network temporary identity, which is used to schedule retransmission scrambling.

In an embodiment, the source cell sends at least one LTM candidate cell configuration information through RRC reconfiguration (RRCReconfiguration) signaling.

In an embodiment, the terminal device receives at least one LTM candidate cell configuration information and saves it locally.

In an embodiment, the pre-configuration (Pre-config) is reconfigured through RRC.

In an embodiment, the at least one LTM candidate cell configuration information is candidate cell preconfiguration information.

In an embodiment, LTM candidate cell configuration information is distinguished by identity (LTM-CandidateId).

In an embodiment, the terminal device sends an RRC reconfiguration complete message to the source cell.

In an embodiment, the terminal device performs layer one measurement according to the layer one measurement configuration.

In an embodiment, the terminal device performs layer one measurement according to media access control elements (MACE) and/or downlink control information (DCI) instructions.

In an embodiment, when at least one target candidate cell satisfies Layer 1 measurement report, the Layer 1 (L1) measurement report is reported.

In an embodiment, the network device determines the candidate cells that need to perform early uplink synchronization based on the layer 1 measurement report results and delivers PDCCH-order through downlink control information to trigger the terminal device to initiate random access to the target cell, so as to obtain the TA value of the target cell in advance.

In an embodiment, the DCI carries a candidate cell configuration index (LTM-CandidateId).

In an embodiment, the terminal device sends a random access preamble to the corresponding candidate cell according to the random access triggered by PDCCH-order.

In an embodiment, the terminal device determines the early uplink synchronization configuration of the corresponding cell through the candidate cell configuration index carried by the DCI, and sends the random access preamble according to the early uplink synchronization configuration.

In an embodiment, after receiving the random access preamble sent by the terminal device, the target candidate cell calculates the TA value and sends it to the source cell.

In an embodiment, the source cell receives the TA value provided by the candidate cell and determines the cell to perform LTM cell switch, and sends the LTM cell switch command carrying the TA value of the corresponding candidate cell to the terminal device.

In an embodiment, the LTM cell switch command also carries beam indication (TCI-State) information and/or candidate cell identity.

In an embodiment, the source cell carries the TA value of the corresponding candidate cell through a random access response and sends it to the terminal device.

In an embodiment, the source cell sends notification information to the target candidate cell after sending the LTM cell switch command.

In an embodiment, the notification information also includes beam indication information.

In an embodiment, the notification information can be sent based on existing inter-base station and/or unit (for example, gNB-CU, gNB-DU) signaling, for example, F1 interface signaling: UE CONTEXT SETUP REQUEST/RESPONSE, UE CONTEXT MODIFICATION REQUEST/RESPONSE, UL/DL RRC MESSAGE TRANSFER, and/or, for example, Xn interface signaling: HANDOVER REQUEST, HANDOVER REQUEST ACKNOWLEDGE, which is not limited in the embodiment of the present application.

In an embodiment, the unit includes a distributed unit (DU) and/or a central unit (CU).

In an embodiment, the terminal device receives an LTM cell switch command.

In an embodiment, the terminal device performs random access-less to handover to the target candidate cell based on the TA value carried in the LTM cell switch command, determines the configured grant configuration based on the beam indication information, and starts the retransmission timer.

In an embodiment, the random access-less further includes: the TA value of the target candidate cell is 0 and/or the TA value of the target cell is the same as the source cell.

In an embodiment, the random access-less includes: not initiating a random access procedure when performing an LTM cell switch process.

In an embodiment, the terminal device sends LTM random access-less cell switch completion information according to the determined configured grant configuration.

In an embodiment, the retransmission timer can also be started after the LTM random access-less cell switch completion information is sent.

In an embodiment, the LTM random access-less cell switch completion information includes: user plane data and/or RRC reconfiguration completion signaling.

In an embodiment, the terminal device sends LTM random access-less cell switch completion information through the default HARQ process, for example, HARQ ID 0.

In an embodiment, during the operation of the retransmission timer, the terminal device does not retransmit the LTM random access-less cell switch completion information.

In an embodiment, when the retransmission timer times out, the terminal device retransmits the LTM random access-less cell switch completion information through configured grant, including: sending scheduling grant and/or HARQ information to the HARQ entity and further performing retransmission processing.

In an embodiment, the terminal device retransmits the LTM random access-less cell switch completion information through the default HARQ process.

In an embodiment, the retransmission will not be regarded as a new data indicator (NDI) toggle.

In an embodiment, the HARQ information includes at least one of NDI and HARQ process ID.

In an embodiment, the target cell responds to the LTM random access-less cell switch completion information sent by the terminal device, sends new scheduling transmission information and treats the LTM cell switch as completed.

In an embodiment, after receiving new scheduling transmission (new transmission) information of the target cell, the terminal device regards the candidate cell as the serving cell.

In an embodiment, the new scheduling transmission information includes: downlink control information sent by the PDCCH, which meets the new transmission scheduling of the terminal device's C-RNTI.

In an embodiment, the new transmission scheduling is a downlink transmission scheduling and/or an uplink transmission scheduling.

In an embodiment, the terminal device releases the configured grant after completing the LTM cell switch.

In an embodiment, the terminal device stops the configured grant retransmission timer.

In an embodiment, the DCI carries a retransmission scheduling indication, and the retransmission scheduling indication is no retransmission.

In an embodiment, the upper layer is notified that LTM cell switch is completed.

In an embodiment, the configured grant retransmission timer can also use cg-RetransmissionTimer or cg-SDT-RetransmissionTimer.

In the above solution of this embodiment, specifically, the terminal device responds to the timeout of the retransmission timer, determines that the scheduling method is configured grant, and retransmits the LTM random access-less cell switch completion information based on the configured grant, so that the network device receives the LTM random access-less cell switch completion information, which can improve the transmission reliability of LTM random access-less cell switch completion information, and/or reduce LTM cell switch failures, and/or reduce service interruption delays, and/or introduce the retransmission timer suitable for LTM cell switch to clarify the retransmission mechanism of the uplink data transmission.

Based on any of the foregoing embodiments of the present application, this embodiment further discloses the retransmission method in the foregoing embodiments.

Figure 9:
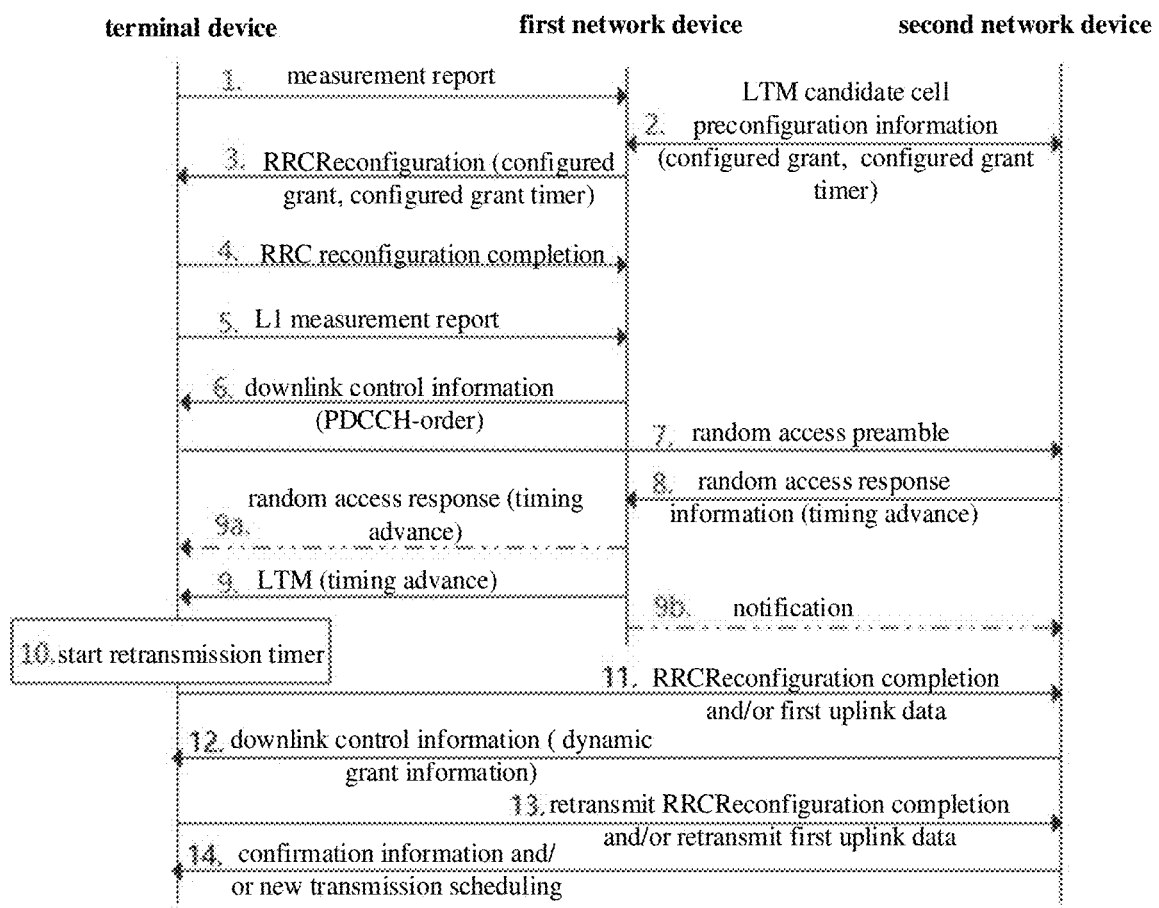
FIG. 9 is a schematic diagram of an interaction process according to an embodiment of the present application.

Referring to FIG. 9, FIG. 9 is a schematic diagram of an interaction process according to an embodiment of the present application. As shown in FIG. 9, the terminal device reports a measurement report to the source cell. In an embodiment, the measurement report is a layer 3 measurement report.

In an embodiment, the source cell obtains at least one candidate cell configuration information, including: candidate cell configuration and/or retransmission timer.

In an embodiment, the retransmission timer includes a configured grant retransmission timer and/or an LTM cell switch retransmission timer, for example, cg-LTM-RetransmissionTimer, which is used to retransmit the LTM random access-less cell switch completion information.

In an embodiment, the candidate cell configuration information also includes at least one of early uplink synchronization configuration, configured grant configuration, candidate cell complete configuration indication, layer one measurement configuration, and new terminal device wireless temporary identity.

In an embodiment, the layer one measurement configuration includes: LTM channel state information resource configuration and/or LTM channel state information report configuration.

In an embodiment, the configured grant configuration is also associated with beam information.

In an embodiment, the configuring scheduling configuration includes configured grant type 1.

In an embodiment, the new terminal device wireless temporary identity includes but is not limited to at least one of C-RNTI, CS-RNTI, and cg-LTM-CS-RNTI.

In an embodiment, the source cell sends at least one LTM candidate cell configuration information through RRC reconfiguration signaling.

In an embodiment, the terminal device receives at least one LTM candidate cell configuration information and saves it locally.

In an embodiment, the preconfiguration is configured through RRC reconfiguration signaling.

In an embodiment, the at least one LTM candidate cell configuration information is candidate cell preconfiguration information.

In an embodiment, the LTM candidate cell configuration information is distinguished by identity.

In an embodiment, the terminal device sends RRC reconfiguration completion information to the source cell.

In an embodiment, the terminal device performs layer one measurement according to the layer one measurement configuration.

In an embodiment, the terminal device performs layer one measurement according to the MAC CE and/or DCI indication.

In an embodiment, when at least one target candidate cell meets the layer one measurement report, the layer one measurement report is reported.

In an embodiment, the network device determines the candidate cells that need to perform early uplink synchronization based on the layer 1 measurement report results and delivers PDCCH-order through downlink control information to trigger the terminal device to initiate random access to the target cell, so as to obtain the TA value of the target cell in advance.

In an embodiment, the DCI carries a candidate cell configuration index.

In an embodiment, the terminal device sends a random access preamble to the corresponding candidate cell according to the random access triggered by PDCCH-order.

In an embodiment, the terminal device determines the early uplink synchronization configuration of the corresponding cell through the candidate cell configuration index carried by the DCI, and sends the random access preamble according to the early uplink synchronization configuration.

In an embodiment, after receiving the random access preamble sent by the terminal device, the target candidate cell calculates the TA value and sends it to the source cell.

In an embodiment, the source cell receives the TA value provided by the candidate cell and determines the cell to perform LTM cell switch, and sends the LTM cell switch command carrying the TA value of the corresponding candidate cell to the terminal device.

In an embodiment, the LTM cell switch command also carries beam indication information and/or candidate cell identification.

In an embodiment, the source cell carries the TA value of the corresponding candidate cell through a random access response and sends it to the terminal device.

In an embodiment, the source cell sends notification information to the target candidate cell after sending the LTM cell switch command.

In an embodiment, the notification information also includes beam indication information.

In an embodiment, the notification information may be sent based on existing inter-gNB and/or unit (for example, gNB-CU, gNB-DU) signaling, which is not limited in the embodiments of the present application.

In an embodiment, the unit includes: a decentralized unit and/or a central unit.

In an embodiment, the terminal device receives an LTM cell switch command.

In an embodiment, the terminal device performs random access-less to handover to the target candidate cell based on the TA value carried in the LTM cell switch command, determines the configured grant configuration based on the beam indication information, and starts the retransmission timer.

In an embodiment, the random access-less further includes: the TA value of the target candidate cell is 0 and/or the TA value of the target cell is the same as the source cell.

In an embodiment, the random access-less includes: not initiating a random access procedure when performing an LTM cell switch process.

In an embodiment, the terminal device sends LTM random access-less cell switch completion information according to the determined configured grant configuration.

In an embodiment, the retransmission timer can also be started after the LTM random access-less cell switch completion information is sent.

In an embodiment, the LTM random access-less cell switch completion information includes: user plane data and/or RRC reconfiguration completion signaling.

In an embodiment, the terminal device sends the LTM random access-less cell switch completion information through the default HARQ process, for example, HARQ ID 0.

In an embodiment, the network device sends the dynamic grant information, and the scheduling information includes uplink scheduling and/or downlink scheduling. The terminal device further processes according to the scheduling information.

In an embodiment, if the scheduling information is downlink scheduling and the terminal device has initially sent the LTM random access-less cell switch completion information, the LTM cell switch is deemed to be completed.

In an embodiment, the downlink scheduling is a new transmission scheduling.

In an embodiment, the downlink scheduling and the initial transmission of the first uplink data use the same HARQ process or a default HARQ process.

In an embodiment, the terminal device notifies the upper layer that the LTM cell switch is completed.

In an embodiment, if the terminal device has initially sent the LTM random access-less cell switch completion information and the scheduling information is uplink scheduling, then:

when the uplink scheduling is received and the previous transmission is performed using the configured grant Type 1 or Type 2, if the previous transmission is the LTM random access-less cell switch completion information, the NDI will not be toggled and it will be regarded as a retransmission scheduling; if the previous transmission does not include the LTM random access-less cell switch completion information, the NDI is toggled and the LTM cell switch is deemed to be completed.

And/or, when the uplink scheduling is received and the previous configured grant is Type 1 or Type 2, if the retransmission timer is still running, the NDI will not be toggled and it will be regarded as a retransmission scheduling; if the retransmission timer is not running, the NDI is toggled, and the LTM cell switch is deemed to be completed.

In an embodiment, the retransmission timer can be an LTM cell switch retransmission timer, for example, cg-LTM-RetransmissionTimer.

In an embodiment, the terminal device retransmits the LTM random access-less cell switch completion information according to dynamic grant.

In an embodiment, the network device receives the LTM random access-less cell switch completion information.

In an embodiment, the configured grant configuration also includes: configured grant type 2 (CG Type 2).

In an embodiment, after the terminal device performs random access-less, it monitors the physical downlink control channel to receive downlink control information. When the downlink control information meets the CS-RNTI of the terminal device, the terminal device sends the LTM random access-less cell switch completion information based on CG Type 2.

In embodiment, when the DCI delivered by the downlink control channel meets the CS-RNTI of the terminal device, the terminal device starts the retransmission timer and sends the LTM random access-less cell switch completion information. In an embodiment, the terminal device starts the configured grant timer after sending the LTM random access-less cell switch completion information.

In this embodiment, through the above solution, specifically, the terminal device responds to receiving the dynamic grant information, determines that the scheduling method is dynamic grant according to the dynamic grant information, and retransmits the LTM random access-less cell switch completion information based on the dynamic grant, so that the network device receives the LTM random access-less cell switch completion information, which can improve the transmission reliability of the LTM random access-less cell switch completion information, and/or reduce LTM cell switch failures, and/or reduce service interruption delay, and/or, introduce the retransmission timer applicable to LTM cell switch to clarify the retransmission mechanism of the uplink data transmission, and/or supports type 2 configured grant, making the retransmission scheduling method more flexible.

Figure 10:
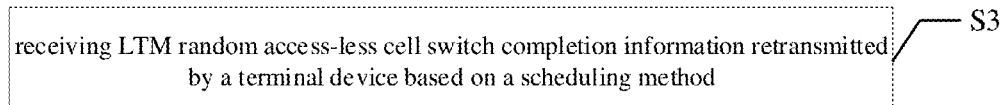
FIG. 10 is a schematic flowchart of a retransmission method according to an embodiment of the present application.

Referring to FIG. 10, FIG. 10 is a schematic flowchart of a retransmission method according to an embodiment of the present application. The method in the embodiment of the present application can be applied to a network device (such as a base station), and includes:

S3, receiving the LTM random access-less cell switch completion information retransmitted by the terminal device based on the scheduling method.

In an embodiment, before step S3, at least one of the following can also be included:

sending the preconfiguration information, so that the terminal device selects or determines a scheduling method based on the preconfiguration information, and retransmits the LTM random access-less cell switch completion information based on the scheduling method;

sending the LTM cell switch command;

sending the dynamic grant information, so that the terminal device selects or determines a scheduling method based on the dynamic grant information, and retransmits the LTM random access-less cell switch completion information based on the scheduling method; and sending confirmation information and/or the new transmission scheduling based on the LTM random access-less cell switch completion information.

In an embodiment, the network device in this embodiment of the present application includes a first network device corresponding to the source cell and/or a second network device corresponding to the candidate cell (target cell).

In an embodiment, the first network device sends configuration information of at least one LTM candidate cell to the terminal device through RRC reconfiguration signaling.

In an embodiment, the terminal device receives the configuration information of at least one LTM candidate cell and saves it locally.

In an embodiment, the configuration information of at least one LTM candidate cell is candidate cell preconfiguration information.

In an embodiment, the preconfiguration information can include configured grant and/or retransmission timer.

In an embodiment, the first network device receives the TA value provided by the second network device and determines the cell to perform LTM cell switch, and sends the LTM cell switch command carrying the TA value of the corresponding candidate cell to the terminal device.

In an embodiment, the terminal device receives an LTM cell switch command.

In an embodiment, the preconfigured information includes a retransmission timer.

In an embodiment, the LTM cell switch command is used to instruct the terminal device to perform LTM random access-less and/or start the retransmission timer.

In an embodiment, the dynamic grant information is also used to instruct the terminal device to perform new uplink transmission and/or downlink transmission.

In an embodiment, the terminal device receives the LTM cell switch command sent by the first network device.

In an embodiment, the terminal device performs random access-less to switch to the target candidate cell based on the TA value carried in the LTM cell switch command, determines the configured grant configuration based on the beam indication information, and starts the retransmission timer.

In an embodiment, the terminal device sends the LTM random access-less cell switch completion information to the second network device according to the determined configured grant configuration.

In an embodiment, the retransmission timer includes configured grant retransmission timer and/or an LTM cell switch retransmission timer.

In an embodiment, the LTM random access-less cell switch completion information includes radio resource control reconfiguration completion information and/or the first uplink data.

In an embodiment, the terminal device sends the LTM random access-less cell switch completion information to the second network device through a default hybrid automatic repeat request.

In an embodiment, the terminal device selects or determines the scheduling method, and retransmits the LTM random access-less cell switch completion information to the second network device based on the scheduling method.

In an embodiment, during the operation of the retransmission timer, the terminal device does not retransmit the LTM random access-less cell switch completion information. In an embodiment, if the retransmission timer times out, the terminal device determines that the scheduling method is configured grant, and retransmits the LTM random access-less cell switch completion information to the second network device through the configured grant.

In an embodiment, during the operation of the retransmission timer, if the terminal device receives the dynamic grant information sent by the second network device, it can determine that the scheduling method is dynamic grant based on the dynamic grant information, and retransmit the LTM random access-less cell switch completion information through the dynamic scheduling.

In an embodiment, the second network device sends the dynamic grant information, and the dynamic grant information includes uplink scheduling and/or downlink scheduling. The terminal device further processes according to the dynamic grant information.

In an embodiment, if the dynamic grant information received by the terminal device is downlink scheduling, the LTM cell switch is deemed to be completed.

In an embodiment, if the dynamic grant information received by the terminal device is downlink scheduling, and the terminal device has initially sent the LTM random access-less cell switch completion information, the LTM cell switch is deemed to be completed.

In an embodiment, the downlink scheduling is a new transmission scheduling.

In an embodiment, the downlink scheduling and the initial transmission of the first uplink data use the same HARQ process or a default HARQ process.

In an embodiment, the terminal device notifies the upper layer that the LTM cell switch is completed.

In an embodiment, if the scheduling information is uplink scheduling and the terminal device has initially sent the LTM random access-less cell switch completion information, then:

when the uplink scheduling is received and the previous transmission is performed using configured grant Type 1 or Type 2, if the previous transmission is the LTM random access-less cell switch completion information (including radio resource control reconfiguration completion information and/or the first uplink data), the NDI is not toggled, and it is regarded as retransmission scheduling; and/or, if the previous transmission does not include radio resource control reconfiguration completion information or the first uplink data, the NDI is toggled, and the LTM cell switch is deemed to be completed;

and/or, when the uplink scheduling is received and the previous transmission is performed using the configured grant Type 1 or Type 2, if the retransmission timer is still running, the NDI will not be toggled and it will be regarded as a retransmission scheduling; and/or, if the retransmission timer is not running, the NDI is toggled, and the LTM cell switch is deemed to be completed.

In an embodiment, the terminal device retransmits the LTM random access-less cell switch completion information according to the dynamic grant.

In an embodiment, the second network device receives the LTM random access-less cell switch completion information.

In an embodiment, the second network device sends the confirmation information and/or a new transmission scheduling based on the LTM random access-less cell switch completion information.

This embodiment, through the above solution, specifically, the network device receives the LTM random access-less cell switch completion information retransmitted by the terminal device based on the scheduling method, provides an information retransmission mechanism suitable for the LTM cell switch process, which can improve the transmission reliability of the LTM random access-less cell switch completion information, thereby reducing LTM cell switch failures and/or reducing service interruption delays.

In the embodiment of the present application, a method for the terminal device to retransmit the LTM random access-less cell switch completion information based on the configured grant is provided.

In an embodiment, the first network device sends at least one LTM candidate cell preconfiguration information to the terminal device through RRC reconfiguration signaling.

In an embodiment, the terminal device receives at least one LTM candidate cell preconfiguration information and saves it locally. In an embodiment, the preconfiguration information is reconfigured through RRC.

In an embodiment, the preconfiguration information is sent by the second network device to the first network device.

In an embodiment, the preconfiguration information includes candidate cell configuration information and/or retransmission timer.

In an embodiment, the candidate cell configuration information also includes at least one of early uplink synchronization configuration, configured grant configuration, candidate cell complete configuration indication, layer one measurement configuration, and new terminal device wireless temporary identity.

In an embodiment, the layer one measurement configuration includes LTM channel state information resource configuration and/or LTM channel state information report configuration.

In an embodiment, the configured grant configuration is also associated with beam information.

In an embodiment, the configured grant configuration includes configured grant type 1.

In an embodiment, the new terminal device wireless temporary identity includes but is not limited to at least one of C-RNTI, CS-RNTI and cg-LTM-CS-RNTI.

In an embodiment, the terminal device selects or determines a scheduling method based on the preconfiguration information, and retransmits the LTM random access-less cell switch completion information based on the scheduling method.

In an embodiment, the terminal device sends the RRC reconfiguration completion to the first network device, and when at least one target candidate cell satisfies the layer one measurement report, the layer one measurement report is reported.

In an embodiment, the first network device determines the candidate cell that needs to perform early uplink synchronization based on the layer one measurement report and delivers the PDCCH-order through the downlink control information to trigger the terminal device to initiate random access to the target cell, so as to obtain the TA value of the target cell in advance.

In an embodiment, the downlink control information carries a candidate cell configuration index.

In an embodiment, after receiving the random access preamble sent by the terminal device, the target cell calculates the TA value and sends it to the first network device.

In an embodiment, the first network device receives the TA value provided by the second network device and determines the cell to perform LTM cell switch, and sends the TA value of the corresponding candidate cell to the terminal device through an LTM cell switch command.

In an embodiment, the LTM cell switch command also carries beam indication information and/or candidate cell identity.

In an embodiment, the terminal device performs random access-less to switch to the second network device according to the TA value carried in the LTM cell switch command, determines the configured grant configuration according to the beam indication information, and starts the retransmission timer.

In an embodiment, the retransmission timer includes configured grant retransmission timer and/or an LTM cell switch retransmission timer.

In an embodiment, the configured grant retransmission timer can also use cg-Retransmission Timer or cg-SDT-RetransmissionTimer.

In an embodiment, the LTM cell switch retransmission timer can be cg-LTM-RetransmissionTimer, which is used to random access-less LTM cell switch retransmission, which is not specifically limited in the embodiment of the present application.

In an embodiment, the terminal device sends the LTM random access-less cell switch completion information according to the determined configured grant configuration.

In an embodiment, the retransmission timer can be started before or after the LTM random access-less cell switch completion information is sent.

In an embodiment, when the retransmission timer times out, the terminal device retransmits the LTM random access-less cell switch completion information through configured grant, which, in an embodiment, includes: sending the scheduling information and/or HARQ information to the HARQ entity and further performing retransmission processing.

In an embodiment, the terminal device retransmits the first uplink data through the default HARQ process.

In an embodiment, the retransmission will not be considered a new data indication toggle.

In an embodiment, the HARQ information includes NDI and/or HARQ process identity.

In an embodiment, the new data indication is used to indicate that the data sent this time is a new transmission or a retransmission of the previous data sent. In an embodiment, the new data indication determines that the data sent this time is a new transmission by toggling, and the new data indication determines that it is a retransmission by not toggling. For example, the NDI indication of the previous data sent is 0. If it is determined to be a retransmission this time, the NDI indication of the data sent this time will still be 0.

In an embodiment, the second network device responds to the LTM random access-less cell switch completion information sent and/or retransmitted by the terminal device, sends the confirmation information and/or a new transmission scheduling, and considers the LTM cell switch to be completed. After receiving the new transmission scheduling of the second network device, the terminal device regards the candidate cell as the serving cell.

In an embodiment, the terminal device releases the configured grant after completing the LTM cell switch, and/or the terminal device stops the retransmission timer.

This embodiment, through the above solution, specifically, the terminal device selects or determines the scheduling method based on the preconfiguration information sent by the first network device, including: the terminal device responds to the timeout of the retransmission timer, determines that the scheduling method is configured grant, and retransmits the LTM random access-less cell switch completion information based on the configured grant to ensure that the second network device receives the LTM random access-less cell switch completion information, which can improve the transmission reliability of the LTM random access-less cell switch completion information, and/or reduce LTM cell switch failures, and/or, reduce the service interruption delay, and/or clarify the retransmission mechanism of the uplink data transmission by introducing the retransmission timer suitable for LTM cell switch.

In the embodiments of the present application, a method for the terminal device to retransmit the LTM random access-less cell switch completion information based on dynamic grant is provided.

In an embodiment, the first network device sends at least one LTM candidate cell preconfiguration information to the terminal device through RRC reconfiguration signaling.

In an embodiment, the terminal device receives at least one LTM candidate cell preconfiguration information and saves it locally. In an embodiment, the preconfiguration information is reconfigured through RRC.

In an embodiment, the preconfiguration information is sent by the second network device to the first network device.

In an embodiment, the preconfiguration information includes candidate cell configuration information and/or retransmission timer.

In an embodiment, the terminal device selects or determines the scheduling method based on the preconfiguration information, and retransmits the LTM random access-less cell switch completion information based on the scheduling method.

In an embodiment, the terminal device sends the RRC reconfiguration completion to the first network device, and when at least one target candidate cell satisfies the layer one measurement report, the layer one measurement report is reported.

In an embodiment, the first network device determines the candidate cells that need to perform early uplink synchronization based on the layer one measurement report and delivers PDCCH-order through the downlink control information to trigger the terminal device to initiate random access to the second network device, so as to obtain the TA value of the target cell in advance.

In an embodiment, after receiving the random access preamble sent by the terminal device, the second network device calculates the TA value and sends it to the first network device.

In an embodiment, the first network device receives the TA value provided by the second network device and determines the cell to perform LTM cell switch, and sends the TA value of the corresponding candidate cell to the terminal device through an LTM cell switch command.

In an embodiment, the terminal device performs the random access-less to switch to the target cell based on the TA value carried in the LTM cell switch command, determines the configured grant configuration based on the beam indication information, and starts the retransmission timer.

In an embodiment, the second network device sends dynamic grant information, and the dynamic grant information includes uplink scheduling and/or downlink scheduling. The terminal device further processes according to the dynamic grant information.

In an embodiment, if the scheduling information is downlink scheduling and the terminal device has initially sent the LTM random access-less cell switch completion information, the LTM cell switch is deemed to be completed.

In an embodiment, the downlink scheduling is a new transmission scheduling.

In an embodiment, the downlink scheduling and the initial transmission of the first uplink data use the same HARQ process or a default HARQ process.

In an embodiment, the terminal device notifies the upper layer that the LTM cell switch is completed.

In an embodiment, if the scheduling information is uplink scheduling and the terminal device has initially sent the LTM random access-less cell switch completion information, then:

when the uplink scheduling is received and the previous transmission is performed using configured grant Type 1 or Type 2, if the previous transmission is the LTM random access-less cell switch completion information (including radio resource control reconfiguration completion information and/or the first uplink data), the NDI is not toggled, and it is regarded as retransmission scheduling; and/or, if the previous transmission does not include radio resource control reconfiguration completion information or the first uplink data, the NDI is toggled, and the LTM cell switch is deemed to be completed; and/or, when the uplink scheduling is received and the previous configured grant is Type 1 or Type 2, if the retransmission timer is still running, the NDI will not be toggled and it will be regarded as a retransmission scheduling; and/or, if the retransmission timer is not running, the NDI is toggled, and the LTM cell switch is deemed to be completed.

In an embodiment, the terminal device retransmits the LTM random access-less cell switch completion information according to the dynamic scheduling.

In an embodiment, the second network device receives the LTM random access-less cell switch completion information.

In an embodiment, the terminal device sends new uplink data and/or receives new downlink data according to the dynamic scheduling.

Through the above solution, this embodiment specifically uses the terminal device to select or determine the scheduling method based on the preconfiguration information sent by the first network device, including: the terminal device determines that the scheduling method is dynamic grant based on the dynamic grant information sent by the second network device, and retransmits the LTM random access-less cell switch completion information based on the dynamic grant to ensure that the second network device receives the LTM random access-less cell switch completion information, which can improve the transmission reliability of LTM random access-less cell switch completion information, and/or reduce LTM cell switch failures, and/or, reduce the service interruption delay, and/or, a method for retransmitting the LTM random access-less cell switch completion information through dynamic grant is provided, which can clarify the processing mechanism in different situations, and/or, make the scheduling method more flexible.

Figure 11:
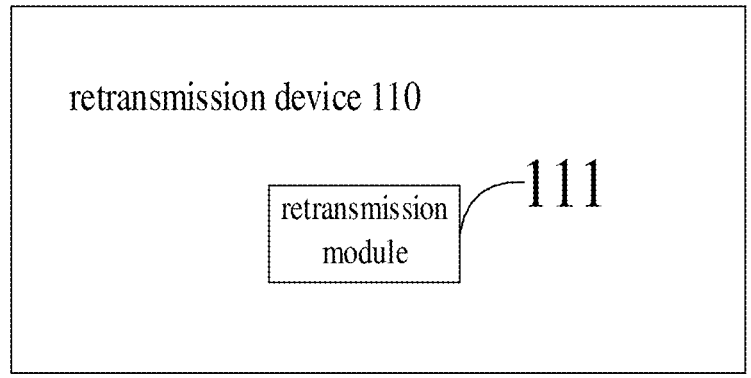
FIG. 11 is a schematic structural diagram of a retransmission device according to an embodiment of the present application.

Please refer to FIG. 11, FIG. 11 is a schematic structural diagram of a retransmission device provided by an embodiment of the present application. This device can be mounted on or be the terminal device in the above method embodiment. The retransmission device shown in FIG. 11 can be used to perform some or all of the functions in the method embodiments described in the above embodiments. As shown in FIG. 11, the retransmission device 110 includes a retransmission module 111.

The retransmission module 111 is configured to retransmit the LTM random access-less cell switch completion information based on the scheduling method.

In an embodiment, the device further includes at least one of the following:

determining configured grant configuration based on preconfiguration information;

starting the retransmission timer;

sending the LTM random access-less cell switch completion information through the default hybrid automatic repeat request; and selecting or determining the scheduling method.

In an embodiment, selecting or determining the scheduling method includes:

in response to the timeout of the retransmission timer, determining that the scheduling method is configured grant; and/or, in response to receiving the dynamic grant information, determining that the scheduling method is the dynamic grant according to the dynamic grant information.

In an embodiment, the scheduling method includes configured grant and/or dynamic grant.

In an embodiment, the LTM random access-less cell switch completion information includes radio resource control reconfiguration completion information and/or the first uplink data.

In an embodiment, the retransmission timer includes the configured grant retransmission timer and/or an LTM cell switch retransmission timer.

In an embodiment, the dynamic grant information includes uplink scheduling and/or downlink scheduling.

In an embodiment, determining that the scheduling method is dynamic grant based on the dynamic grant information includes:
  if the dynamic grant information is uplink scheduling, the previous sending method is configured grant, and the previous sending content is the LTM random access-less cell switch completion information, it is determined that the scheduling method is dynamic grant; and/or,
  if the dynamic grant information is uplink scheduling, the previous sending method is configured grant, and the retransmission timer is in the running state, it is determined that the scheduling method is dynamic grant.

In an embodiment, the device also includes:
  if the dynamic grant information is downlink scheduling, instructing new uplink transmission and/or downlink reception according to the downlink scheduling, and/or stopping the retransmission timer.

In an embodiment, the device further includes at least one of the following:
  sending, via the network device, the preconfiguration information;
  retransmitting the LTM random access-less cell switch completion information through the default hybrid automatic repeat request;
  determining to retransmit by no toggling of the new data indication; and
  receiving, via the network device, the LTM random access-less cell switch completion information.

The retransmission device provided by the embodiments of the present application can perform the technical solutions shown in the above method embodiments. The implementation principles and beneficial effects are similar and will not be described again here.

Figure 12:
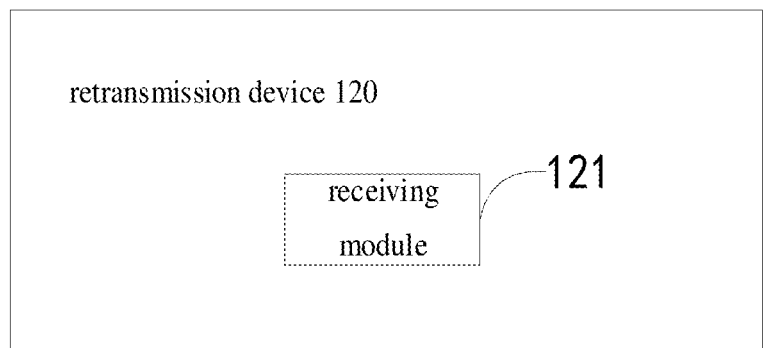
FIG. 12 is a schematic structural diagram of a retransmission device according to an embodiment of the present application.

Please refer to FIG. 12, FIG. 12 is another schematic structural diagram of a retransmission device provided by an embodiment of the present application. This device can be mounted on or be the network device in the above method embodiment. As shown in FIG. 11, the retransmission device 120 includes a receiving module 121.

The receiving module 121 is configured to receive the LTM random access-less cell switch completion information retransmitted by the terminal device based on the scheduling method.

In an embodiment, the device further includes at least one of the following:
  sending the preconfiguration information, so that the terminal device selects or determines the scheduling method based on the preconfiguration information, and retransmits the LTM random access-less cell switch completion information based on the scheduling method;
  sending the LTM cell switch command;
  sending the dynamic grant information, so that the terminal device selects or determines the scheduling method based on the dynamic grant information, and retransmits the LTM random access-less cell switch completion information based on the scheduling method; and
  sending the confirmation information and/or the new transmission scheduling based on the LTM random access-less cell switch completion information.

In an embodiment, the preconfigured information includes the retransmission timer.

In an embodiment, the LTM cell switch command is used to instruct the terminal device to perform LTM random access-less and/or start the retransmission timer.

In an embodiment, the dynamic grant information is also used to instruct the terminal device to perform new uplink transmission and/or downlink transmission.

In an embodiment, the device further includes at least one of the following:
  determining, via the terminal device, the configured grant configuration based on the preconfiguration information;
  starting, via the terminal device, the retransmission timer;
  sending, via the terminal device, the LTM random access-less cell switch completion information through the default hybrid automatic repeat request; and
  selecting or determining, via the terminal device, the scheduling method.

In an embodiment, selecting or determining, via the terminal device, the scheduling method includes:
  determining, via the terminal device, that the scheduling method is configured grant in response to the timeout of the retransmission timer; and/or,
  determining, via the terminal device, that the scheduling method is dynamic grant according to the dynamic grant information in response to receiving the dynamic grant information.

In an embodiment, the scheduling method includes configured grant and/or dynamic grant.

In an embodiment, the LTM random access-less cell switch completion information includes radio resource control reconfiguration completion information and/or the first uplink data.

In an embodiment, the retransmission timer includes a configured grant retransmission timer and/or an LTM cell switch retransmission timer.

In an embodiment, the dynamic grant information includes uplink scheduling and/or downlink scheduling.

In an embodiment, determining, via the terminal device, that the scheduling method is dynamic grant according to the dynamic grant information includes:
  if the dynamic grant information is uplink scheduling, the previous sending method is configured grant, and the previous sending content is LTM random access-less cell switch completion information, determining, via the terminal device, that the scheduling method is dynamic grant; and/or,
  if the dynamic grant information is uplink scheduling, the previous sending method is configured grant, and the retransmission timer is in the running state, determining, via the terminal device, that the scheduling method is dynamic grant.

In an embodiment, the device also includes:
  if the dynamic grant information is downlink scheduling, instructing, via the terminal device, new uplink transmission and/or downlink reception according to the downlink scheduling, and/or stopping, via the terminal device, the retransmission timer.

In an embodiment, the device also includes:
  retransmitting, via the terminal device, the LTM random access-less cell switch completion information through the default hybrid automatic repeat request; and/or, determining, via the terminal device, retransmission by not toggling the new data indication.

The retransmission device provided by the embodiments of the present application can perform the technical solutions shown in the above method embodiments. The implementation principles and beneficial effects are similar and will not be described again here.

Figure 13:
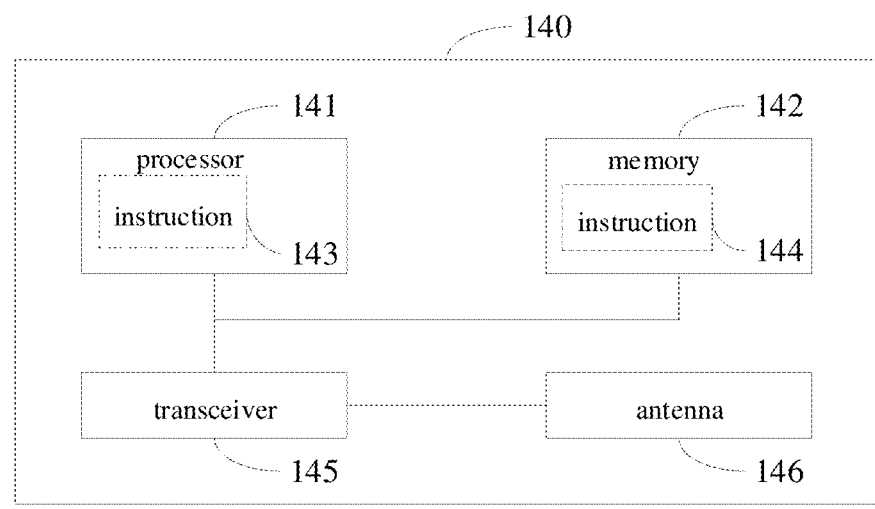
FIG. 13 is a schematic structural diagram of a communication device according to an embodiment of the present application.

Referring to FIG. 13, which is a schematic structural diagram of a communication device provided by an embodiment of the present application. As shown in FIG. 13, the communication device 140 described in this embodiment can be the terminal device (or a component that can be used for the terminal device) or a network device (or a component that can be used for the network device) mentioned in the previous method embodiment. The communication device 140 can be used to implement the method corresponding to the terminal device or network device described in the above method embodiment. For details, please refer to the description in the above method embodiment.

The communication device 140 can include one or more processors 141, which can also be called a processing unit, and can implement certain control or processing functions. The processor 141 can be a general-purpose processor or a special-purpose processor, or the like. For example, it can be a baseband processor or a central processor. The baseband processor can be used to process communication protocols and communication data, and the central processor can be used to control the communication device, execute software programs, and process data of software programs.

In an embodiment, the processor 141 can also store an instruction 143 or data (e.g., intermediate data). In an embodiment, the instruction 143 can be executed by the processor 141, so that the communication device 140 performs the method corresponding to the terminal device or network device described in the above method embodiment.

In an embodiment, the communication device 140 can include a circuit, which can implement sending or receiving or communication functions in the foregoing method embodiments.

In an embodiment, the communication device 140 can include one or more memories 142, on which an instruction 144 can be stored, and the instruction can be executed on the processor 141, so that the communication device 140 performs the method described in the above method embodiment.

In an embodiment, data can also be stored in the memory 142. The processor 141 and the memory 142 can be provided separately or integrated together.

In an embodiment, the communication device 140 can also include a transceiver 145 and/or an antenna 146. The processor 141 can be called a processing unit and controls the communication device 140 (terminal device or core network device or wireless access network device). The transceiver 145 can be called a transceiver unit, a transceiver, a transceiver circuit or a transceiver, etc., and is used to implement the transmission and reception functions of the communication device 140.

In an embodiment, if the communication device 140 is used to implement operations corresponding to the terminal devices in the above embodiments, for example, the transceiver 145 can receive the preconfiguration information; and the processor 141 can determine the scheduling method based on the preconfiguration information, and retransmit the LTM random access-less cell switch completion information based on the scheduling method.

In an embodiment, the specific implementation process of the processor 141 and the transceiver 145 can refer to the relevant descriptions of the above embodiments, and will not be described again here.

In an embodiment, if the communication device 140 is used to implement operations corresponding to the network devices in the above embodiments, for example, the transceiver 145 can receive the LTM random access-less cell switch completion information retransmitted by the terminal device based on the scheduling method.

In an embodiment, the specific implementation process of the processor 141 and the transceiver 145 can refer to the relevant descriptions of the above embodiments, and will not be described again here.

The processor 141 and the transceiver 145 described in the present application can be implemented in the integrated circuit (IC), analog integrated circuit, radio frequency integrated circuit (RFIC), mixed signal integrated circuit, application specific integrated circuit (ASIC), printed circuit board (PCB), electronic device, etc. The processor 141 and the transceiver 145 can also be manufactured using various integrated circuit process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

In the present application, the communication device can be a terminal device (such as a mobile phone) or a network device (such as a base station), which is determined according to the context. In addition, the terminal device can be implemented in various forms. For example, the terminal devices described in the present application can include mobile terminals such as mobile phones, tablet computers, notebook computers, PDAs, personal digital assistants (PDA), portable media players (PMP), navigation devices, wearable devices, smart bracelets and pedometers, as well as fixed terminal devices such as digital TVs and desktop computers.

In the above description of the embodiments, although the communication device is described by taking the terminal device or network device as an example, the scope of the communication device described in the present application is not limited to the above-mentioned terminal device or network device, and the structure of the communication device can not be limited by FIG. 13. The communication device can be a stand-alone device or a part of a larger device.

An embodiment of the present application also provides a communication system, including: the terminal device as described in any of the above embodiments; and the network device as described in any of the above embodiments.

An embodiment of the present application also provides a communication device, including a memory and a processor. A retransmission program is stored in the memory. When the retransmission program is executed by the processor, steps of the retransmission method in any of the above embodiments are implemented.

The communication device in the present application can be the terminal device (such as a mobile phone) or the network device (such as a base station), which is determined according to the context.

An embodiment of the present application also provides a storage medium. A retransmission program is stored on the storage medium. When the retransmission program is executed by a processor, steps of the retransmission method in any of the above embodiments are implemented.

The embodiments of the communication device and storage medium provided by the embodiments of the present application can include all technical features of any of the above-mentioned retransmission method embodiments. The expanded and explanatory content of the description is basically the same as that of each embodiment of the above-mentioned method, and will not be discussed here.

An embodiment of the present application also provides a computer program product. The computer program product includes computer program code. When the computer program code is run on a computer, the computer is caused to perform the methods in the above various possible implementations.

An embodiment of the present application also provides a chip, which includes a memory and a processor. The memory is used to store a computer program. The processor is used to call and run the computer program from the memory, so that the device equipped with the chip performs the methods in the above various possible implementations.

It can be understood that the above scenarios are only examples and do not constitute a limitation on the application scenarios of the technical solutions provided by the embodiments of the present application. The technical solutions of the present application can also be applied to other scenarios. For example, those skilled in the art will know that with the evolution of system architecture and the emergence of new business scenarios, the technical solutions provided in the embodiments of the present application are also applicable to similar technical problems.

The above serial numbers of the embodiments of the present application are only for description and do not represent the advantages and disadvantages of the embodiments.

The steps in the methods of the embodiments of the present application can be sequence adjusted, combined, and deleted according to actual needs.

The units in the device of the embodiments of the present application can be merged, divided, and deleted according to actual needs.

In the present application, the same or similar terms, technical solutions and/or application scenarios are generally only described in detail the first time they appear. When they appear again later, for the sake of simplicity, they are generally not described again. When understanding the technical solutions and other content of the present application, for the same or similar term concepts, technical solutions and/or application scenarios that are not described in detail later, the relevant previous detailed descriptions can be referred to.

In the present application, each embodiment is described with its own emphasis. For parts that are not detailed or recorded in a certain embodiment, please refer to the relevant descriptions of other embodiments.

The technical features of the technical solution of the present application can be combined in any way. In order to simplify the description, all possible combinations of the technical features in the above embodiments are not described. However, as long as there is no contradiction in the combination of these technical features, it should be considered to be within the scope of the present application.

Through the above description of the embodiments, those skilled in the art can clearly understand that the methods of the above embodiments can be implemented by means of software and the necessary general hardware platform. Of course, it can also be implemented by hardware, but in many cases the former is better implementation. Based on this understanding, the technical solution of the present application, or the part that contributes to the existing technology, can essentially be embodied in the form of a software product. The computer software product is stored in one of the above storage media (such as ROM/RAM, magnetic disk, optical disk), including several instructions to cause a terminal device (which can be a mobile phone, computer, server, controlled terminal, or network device, etc.) to execute the method of each embodiment of the present application.

In the above embodiments, it can be implemented in whole or in part by software, hardware, firmware, or any combination thereof. When implemented using software, it can be implemented in whole or in part in the form of the computer program product. The computer program product includes one or more computer instructions. When computer program instructions are loaded and executed on the computer, processes or functions according to embodiments of the present application are generated in whole or in part. The computer can be a general purpose computer, a special purpose computer, a computer network, or other programmable device. The computer instructions can be stored in the storage medium or transmitted from one storage medium to another storage medium, for example, the computer instructions can be transmitted from a website site, computer, server or data center via wired (such as coaxial cable, optical fiber, digital user line) or wireless (such as infrared, wireless, microwave, etc.) to another website site, computer, server or data center. The storage medium can be any available medium that can be accessed by the computer or a data storage device such as a server or data center that contains one or more available media integrations. The available media can be magnetic media (such as floppy disk, storage disk, magnetic tape), optical media (such as DVD), or semiconductor media (such as solid state disk (SSD)), etc.

The above are only preferred embodiments of the present application, and are not intended to limit the patent scope of the present application. Any equivalent structure or equivalent process transformation made using the contents of the description and drawings of the present application, or directly or indirectly applied in other related technical fields, are equally included in the scope of the present application.

What is claimed is:

1. A retransmission method, comprising:
    selecting or determining a scheduling method based on a retransmission timer, comprising: in response to timeout of the retransmission timer, determining that the scheduling method is configured grant; and/or in response to receiving dynamic grant information, determining that the scheduling method is dynamic grant according to the dynamic grant information; and
    retransmitting Layer 1/Layer 2 triggered mobility (LTM) random access-less cell switch completion information based on the scheduling method.

2. The retransmission method of claim 1, further comprising at least one of the following:
    determining configured grant configuration based on pre-configuration information;
    starting a retransmission timer; and
    sending the LTM random access-less cell switch completion information through a default hybrid automatic repeat request.

3. The retransmission method of claim 2, further comprising at least one of the following:
    the scheduling method comprising the configured grant and/or the dynamic grant;

the LTM random access-less cell switch completion information comprising radio resource control reconfiguration completion information and/or first uplink data;

the retransmission timer comprising a configured grant retransmission timer and/or an LTM cell switch retransmission timer; and the dynamic grant information comprising uplink scheduling and/or downlink scheduling.

4. The retransmission method of claim 3, wherein determining that the scheduling method is the dynamic grant according to the dynamic grant information comprises:

in response to that the dynamic grant information is the uplink scheduling, a previous sending method is the configured grant, and previous sending content is the LTM random access-less cell switch completion information, determining that the scheduling method is the dynamic grant; and/or, in response to that the dynamic grant information is the uplink scheduling, a previous sending method is the configured grant, and the retransmission timer is in a running state, determining that the scheduling method is the dynamic grant.

5. The retransmission method of claim 3, further comprising:

in response to that the dynamic grant information is the downlink scheduling, instructing new uplink transmission and/or downlink reception according to the downlink scheduling, and/or stopping the retransmission timer.

6. The retransmission method of claim 2, further comprising at least one of the following:

sending, via a network device, the preconfiguration information;

retransmitting the LTM random access-less cell switch completion information through the default hybrid automatic repeat request;

determining retransmission by no toggle of new data indicator; and receiving, via a network device, the LTM random access-less cell switch completion information.

7. A communication device, comprising a memory, a processor, and a retransmission program stored on the memory and executable on the processor, wherein when the retransmission program is executed by the processor, the retransmission method of claim 1 is implemented.

8. A non-transitory computer-readable storage medium, wherein a computer program is stored on the storage medium, and when the computer program is executed by a processor, the retransmission method of claim 1 is implemented.

9. A retransmission method, comprising:

receiving LTM random access-less handover completion information retransmitted by a terminal device based on a scheduling method, wherein the scheduling method is selected or determined by the terminal device based on a retransmission timer, and selecting or determining, via the terminal device, the scheduling method based on the retransmission timer comprises:

in response to time out of the retransmission timer, determining, via the terminal device, that the scheduling method is configured grant; and/or in response to receiving dynamic grant information, determining, via the terminal device, that the scheduling method is dynamic grant according to the dynamic grant information.

10. The retransmission method of claim 9, further comprising at least one of the following:

sending preconfiguration information, so that the terminal device selects or determines the scheduling method based on the preconfiguration information, and retransmits the LTM random access-less cell switch completion information based on the scheduling method;

sending an LTM cell switch command;

sending dynamic grant information, so that the terminal device selects or determines the scheduling method based on the dynamic grant information, and retransmits the LTM random access-less cell switch completion information based on the scheduling method; and sending confirmation information and/or new transmission scheduling based on the LTM random access-less cell switch completion information.

11. The retransmission method of claim 10, further comprising at least one of the following:

the preconfigured information comprising a retransmission timer;

the LTM cell switch command being configured to instruct the terminal device to perform LTM random access-less and/or start the retransmission timer; and the dynamic grant information being also configured to instruct the terminal device to perform new uplink transmission and/or downlink transmission.

* * * * *